(12) United States Patent
Bang et al.

(10) Patent No.: US 11,202,528 B2
(45) Date of Patent: Dec. 21, 2021

(54) ELECTRIC COOKER

(71) Applicant: Cuckoo Electronics Co., Ltd., Yangsan-si (KR)

(72) Inventors: Ho Sang Bang, Busan (KR); Young Bae Shin, Yangsan-si (KR); Ho Jun Bae, Busan (KR); Duck Cheon Kim, Yangsan-si (KR)

(73) Assignee: Cuckoo Electronics Co., Ltd.

( * ) Notice: Subject to any disclaimer, the term of this patent is extended or adjusted under 35 U.S.C. 154(b) by 392 days.

(21) Appl. No.: 16/120,750

(22) Filed: Sep. 4, 2018

(65) Prior Publication Data
US 2019/0075956 A1 Mar. 14, 2019

(30) Foreign Application Priority Data

Sep. 8, 2017 (KR) .......... 10-2017-0115410
Sep. 8, 2017 (KR) .......... 10-2017-0115411

(51) Int. Cl.
*F27D 11/00* (2006.01)
*A47J 27/08* (2006.01)
*A47J 27/086* (2006.01)
*A47J 27/00* (2006.01)
*A47J 27/09* (2006.01)

(52) U.S. Cl.
CPC ......... *A47J 27/0802* (2013.01); *A47J 27/004* (2013.01); *A47J 27/086* (2013.01); *A47J 27/09* (2013.01)

(58) Field of Classification Search
None
See application file for complete search history.

(56) References Cited

U.S. PATENT DOCUMENTS 2,057,421 A 10/1936 Dickson
5,839,357 A * 11/1998 Ha .......... A47J 27/09
99/337

(Continued)

FOREIGN PATENT DOCUMENTS

CN 101564267 A 10/2009
CN 102038428 B 4/2013

(Continued)

OTHER PUBLICATIONS

Kinoshita, Masashi et al., Nov. 12, 2012, JP2012220091A, Espacenet translation, Description (Year: 2012).*

(Continued)

*Primary Examiner* — Hung D Nguyen
(74) *Attorney, Agent, or Firm* — Luedeka Neely Group, PC

(57) ABSTRACT

An electric cooker capable of changing between a high-pressure mode and a non-pressure mode and cooking a menu corresponding to the changed mode. The electric cooker includes a main body having an accommodation space therein to receive an inner pot, a lid coupled to the upper portion of the main body to be opened and closed, a pressure conversion part for selecting a high-pressure mode and a non-pressure mode by opening and closing a plurality of discharge paths configured to pass through and to block the gap between the inside of the inner pot and the outside of the lid, a sensor for sensing the high-pressure mode or the non-pressure mode selected by the pressure conversion part, and a controller for determining the pressure mode based on the sensing signal from the sensor among the pressure modes at least including the high-pressure mode and the non-pressure mode.

29 Claims, 14 Drawing Sheets

(56) References Cited

U.S. PATENT DOCUMENTS

| | | | |
|---|---|---|---|
| 6,105,810 A | 8/2000 | Daenen et al. | |
| 6,283,015 B1* | 9/2001 | Kwon | A47J 27/09 99/337 |
| 8,205,768 B2 | 6/2012 | Shiffer | |
| 2005/0132894 A1* | 6/2005 | Seurat Guiochet | A47J 27/0813 99/337 |
| 2008/0142498 A1* | 6/2008 | He | A47J 27/0817 219/442 |
| 2012/0012010 A1* | 1/2012 | Baraille | A47J 27/0802 99/325 |
| 2012/0040067 A1* | 2/2012 | Baraille | A47J 27/0802 426/523 |
| 2016/0198883 A1* | 7/2016 | Wang | A47J 27/004 426/231 |

FOREIGN PATENT DOCUMENTS

| | | | | |
|---|---|---|---|---|
| CN | 204015964 U | 12/2014 | | |
| CN | 204970824 U | 1/2016 | | |
| CN | 106606293 A | 5/2017 | | |
| JP | 201222009 A1 * | 11/2012 | | F24C 15/00 |
| JP | 2013106817 A | 6/2013 | | |
| JP | 2014140506 A | 8/2014 | | |
| WO | 2016077988 A1 | 5/2016 | | |

OTHER PUBLICATIONS

Prashant Kumar Kutare Controller of Patents, Government of India, Examination Report, Application 201814033607, dated Jun. 2, 2020, (6 pages), New Delhi, India.

* cited by examiner

ELECTRIC COOKER

TECHNICAL FIELD

The present disclosure relates to an electric cooker, and more specifically, to an electric cooker capable of changing between a high-pressure mode and a non-pressure mode and cooking a menu corresponding to the changed mode.

BACKGROUND

In general, an electric cooker is a device for cooking food by heating an inner pot in which food materials to be cooked are put. The basic structure of the typical electric cooker includes a main body, an inner pot accommodated in the main body to contain food materials, and a lid for covering the upper portion of the main body. The main body is provided with a heating part for heating the inner pot, and the lid is provided to open and close the upper portion of the main body. In addition, a steam discharge part (e.g., a solenoid valve device) configured to open and close a steam discharge passage to adjust the steam inside the inner pot and a pressure relief valve for maintaining the internal pressure of the inner pot at a predetermined level are provided on the lid.

However, since the conventional electric cooker maintains the internal pressure of the inner pot at one set level through the interaction between a weight pressure of the pressure relief valve and a steam pressure, it is impossible to apply or select a cooking mode suitable for the user's taste or the type of food to be cooked, which leads to low quality of food. For example, in the case of food which does not need to be pressurized (such as steamed vegetable dishes, etc.), there is a problem that the texture of food is softened due to the high-pressure. On the contrary, when the user prefers non-pressure rice having a soft texture to pressure rice having a chewy and sticky texture, there is a problem that the user needs to buy a separate non-pressure electric rice cooker or use another common pot to cook the desired rice.

SUMMARY OF THE INVENTION

An object of the present disclosure is to provide an electric cooker which makes it possible to select a change between a high-pressure mode (or cooking) and a non-pressure mode, allow the user to recognize the selected mode and menus corresponding to the selected menu, and cook the menu corresponding to the selected menu.

Another object of the present disclosure is to provide an electric cooker which can determine a high-pressure mode and a non-pressure mode based on a sensing signal from a magnetic sensor and provide the user with the display and guidance corresponding to the determined mode.

A further object of the present disclosure is to provide an electric cooker which can determine various modes such as a high-pressure mode, a non-pressure mode, an error mode and a failure mode based on sensing signals from a plurality of magnetic sensors and provide the user with the display and guidance corresponding to the determined mode.

According to an aspect of the present disclosure for achieving the above objects, there is provided an electric cooker, including: a main body having an accommodation space therein to receive an inner pot, a lid coupled to the upper portion of the main body to be opened and closed, a pressure conversion part for selecting a high-pressure mode and a non-pressure mode by opening and closing a plurality of discharge paths configured to pass through and to block the gap between the inside of the inner pot and the outside of the lid, a sensor for sensing the high-pressure mode or the non-pressure mode selected by the pressure conversion part, and a controller for determining the pressure mode based on the sensing signal from the sensor among the pressure modes at least including the high-pressure mode and the non-pressure mode.

In some embodiments, preferably, the electric cooker includes a display part, and the controller causes the display part to visually or audibly display the determined pressure mode.

In some embodiments, preferably, the electric cooker includes a display part for displaying the prestored menus and an input part for acquiring a menu selection input for the menu selection among the menus displayed on the display part, and the controller stores cooking pressure information on at least some of the prestored menus.

In some embodiments, preferably, the controller determines whether the selected menu from the input part corresponds to the determined pressure mode.

In some embodiments, preferably, the controller determines whether there is a change in pressure mode based on the sensing signal from the sensor, while performing the cooking according to the cooking algorithm.

In some embodiments, preferably, when determining that there is a change in pressure mode, the controller cancels the cooking.

According to another aspect of the present disclosure for achieving the above objects, there is provided a method of controlling an electric cooker for performing the cooking according to pressure modes including a high-pressure mode and a non-pressure mode, the method including: sensing the pressure mode of the electric cooker and displaying the sensed pressure mode.

The electric cooker according to the present disclosure makes it possible to select a change between the high-pressure mode (or cooking) and the non-pressure mode, allow the user to recognize the selected mode and menus corresponding to the selected menu, and cook the menu corresponding to the selected menu. Therefore, the electric cooker can easily change between the non-pressure mode for food which does not need to be pressurized and the high-pressure mode for food which needs to be pressurized, such as the pressure cooking, as a result of which it is possible to freely use a variety of recipes with a single device and cook high-pressure rice having a chewy texture and non-pressure rice having a soft texture according to the user's taste, which leads to the improved compatibility of the product and the improved quality of food.

In addition, the electric cooker according to the present disclosure can determine the high-pressure mode and the non-pressure mode based on the sensing signal from the magnetic sensor and provide the user with the display and guidance corresponding to the determined mode, as a result of which it is possible to perform the cooking according to the desired cooking type (high-pressure/non-pressure) of the user and prevent the quality of food from being reduced due to a wrong selection of the pressure mode or menu.

Moreover, the electric cooker according to the present disclosure can determine various modes such as the high-pressure mode, the non-pressure mode, the error mode and the failure mode based on the sensing signals from the plurality of magnetic sensors and provide the user with the display and guidance corresponding to the determined mode, as a result of which it is possible to perform the cooking according to the desired cooking type (high-pressure/non-pressure) of the user and prevent the quality of food from being reduced due to a wrong selection of the pressure mode or menu.

DETAILED DESCRIPTION

Hereinafter, preferred embodiments of an electric cooker according to the present disclosure will be described in detail with reference to the accompanying drawings.

Figure 1:
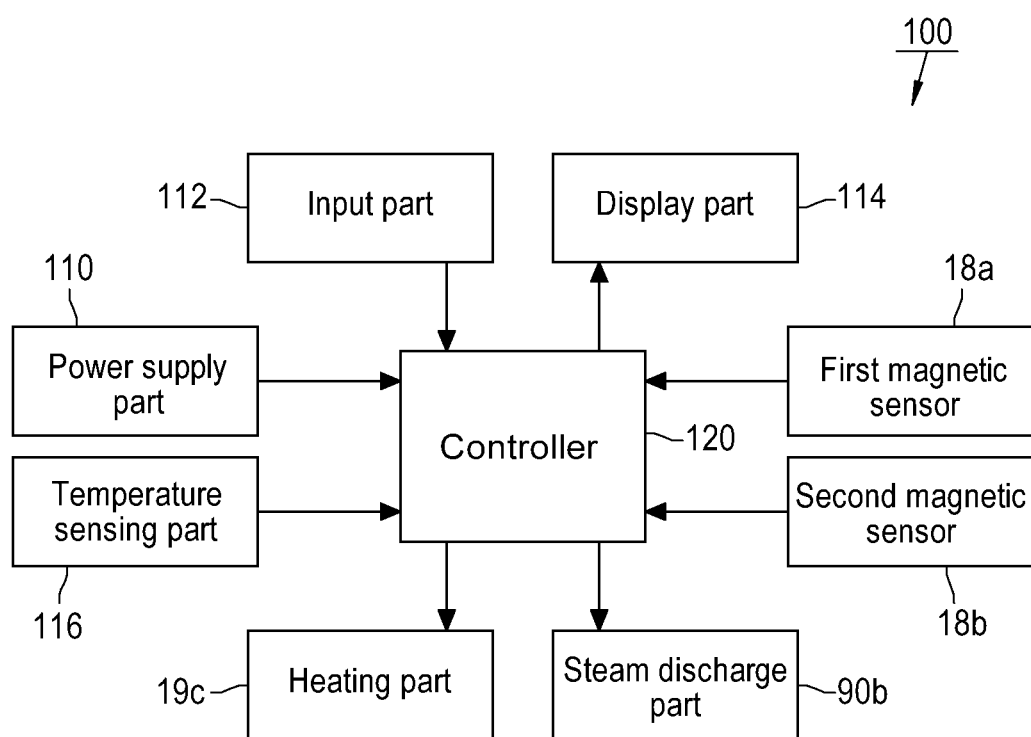
FIG. 1 is a block diagram showing an electric cooker according to the present disclosure.

FIG. 1 is a block diagram showing the electric cooker according to the present disclosure.

The electric cooker 100 according to the present disclosure includes a power supply part 110 receiving commercial power and supplying the necessary power, an input part 112 for receiving an input from the user, such as menu selection, serving size or capacity (amount of food to be cooked), cooking start input, etc., a display part 114 for displaying a cookable menu or a current process, a pressure conversion part (see FIGS. 2 to 4B), for changing between a high-pressure mode and a non-pressure mode due to an external force to select the high-pressure mode and the non-pressure mode, a first magnetic sensor 18a for sensing the high-pressure mode and applying a first sensing signal, a second magnetic sensor 18b for sensing the non-pressure mode and applying a second sensing signal, a steam discharge part 90b operated according to a control signal from a controller 120, a heating part 19c mounted on a main body or lid to apply heat to upper, lateral and lower sides of an inner pot, a temperature sensing part 116 for sensing temperatures of the upper, lateral and lower surfaces of the inner pot, and the controller 120 for controlling the aforementioned components to perform the cooking corresponding to a current pressure mode of the pressure conversion part, i.e., to cook a high-pressure menu corresponding to the high-pressure mode and to cook a non-pressure menu corresponding to the non-pressure mode. In this embodiment, the power supply part 110, the steam discharge part 90b, the heating part 19c and the temperature sensing part 116 are readily recognized by those skilled in the art, so a detailed explanation thereof will be omitted.

More specifically, the input part 112 acquires an input from the user, such as menu selection, serving size or capacity (amount of food to be cooked), cooking start input, etc. and transmits it to the controller 120. In addition, the input part 112 may further include at least one or more sub-input parts corresponding to each of the pressure modes, such as a high-pressure mode cooking start and a non-pressure mode cooking start.

Figure 2:
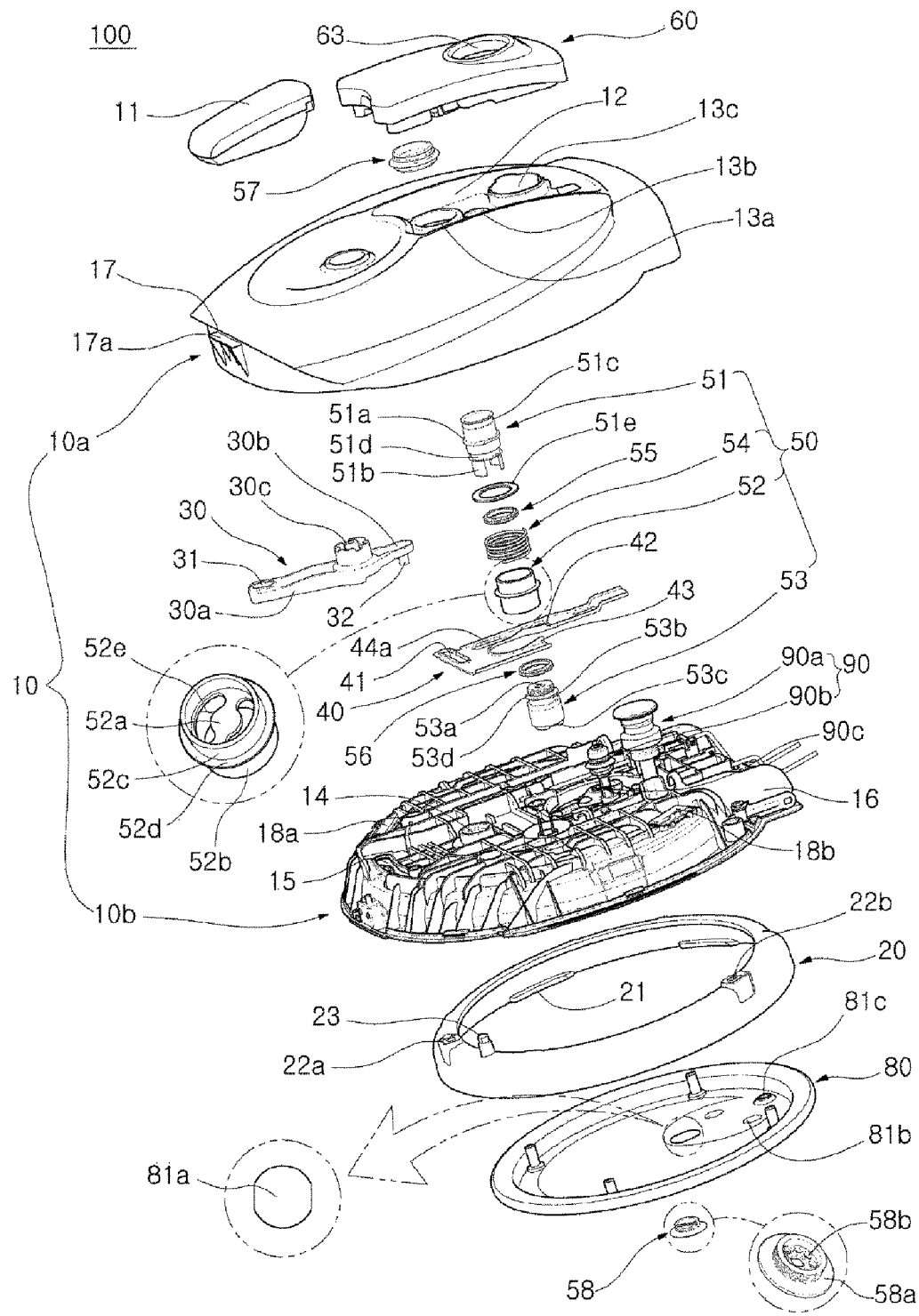
FIG. 2 is an exploded perspective view showing a lid of the electric cooker according to the present disclosure.

The display part 114 displays a cookable menu or a current process as well as visually or audibly displays a current pressure mode (high-pressure mode and non-pressure mode) of the pressure conversion part. Further, the display part 114 may include a sub-display part for individually displaying the current pressure mode, on a handle part (11; FIG. 2), or on a top surface of a lid nearby. Moreover, the display part 114 displays menus corresponding to the high-pressure mode and the non-pressure mode, respectively, so that the user can select the menus corresponding to the high-pressure mode and the non-pressure mode through the input part 112.

The pressure conversion part operates independently from the controller 120 and changes at least between the high-pressure mode and the non-pressure mode (or selects the high-pressure mode and the non-pressure mode) by the manipulation of the handle part (11; FIG. 2) rotated within a certain range of angle by the external force of the user, and the configuration and operation of the pressure conversion part will be described later with reference to FIGS. 2 to 4B.

Meanwhile, the first magnetic sensor 18a and the second magnetic sensor 18b may be implemented as reed switches or magnetoresistive (MR) sensors, which will later be described in detail. Only one of the first magnetic sensor 18a and the second magnetic sensor 18b may also be provided.

In addition, the controller 120 may be implemented as a data processor (e.g., CPU, etc.) to determine and/or store a current pressure mode or a pressure mode changed by the pressure conversion part, based on at least one of the first and second sensing signals from at least one of the first and second magnetic sensors 18a and 18b. The controller 120 also stores cooking pressure information regarding at least some of the prestored menus. The cooking pressure information includes a menu to be cooked in the high-pressure mode (high-pressure menu) and a menu to be cooked in the non-pressure mode (non-pressure menu). Hereinafter, a detailed control method of the controller 120 will be described.

Figure 3A:
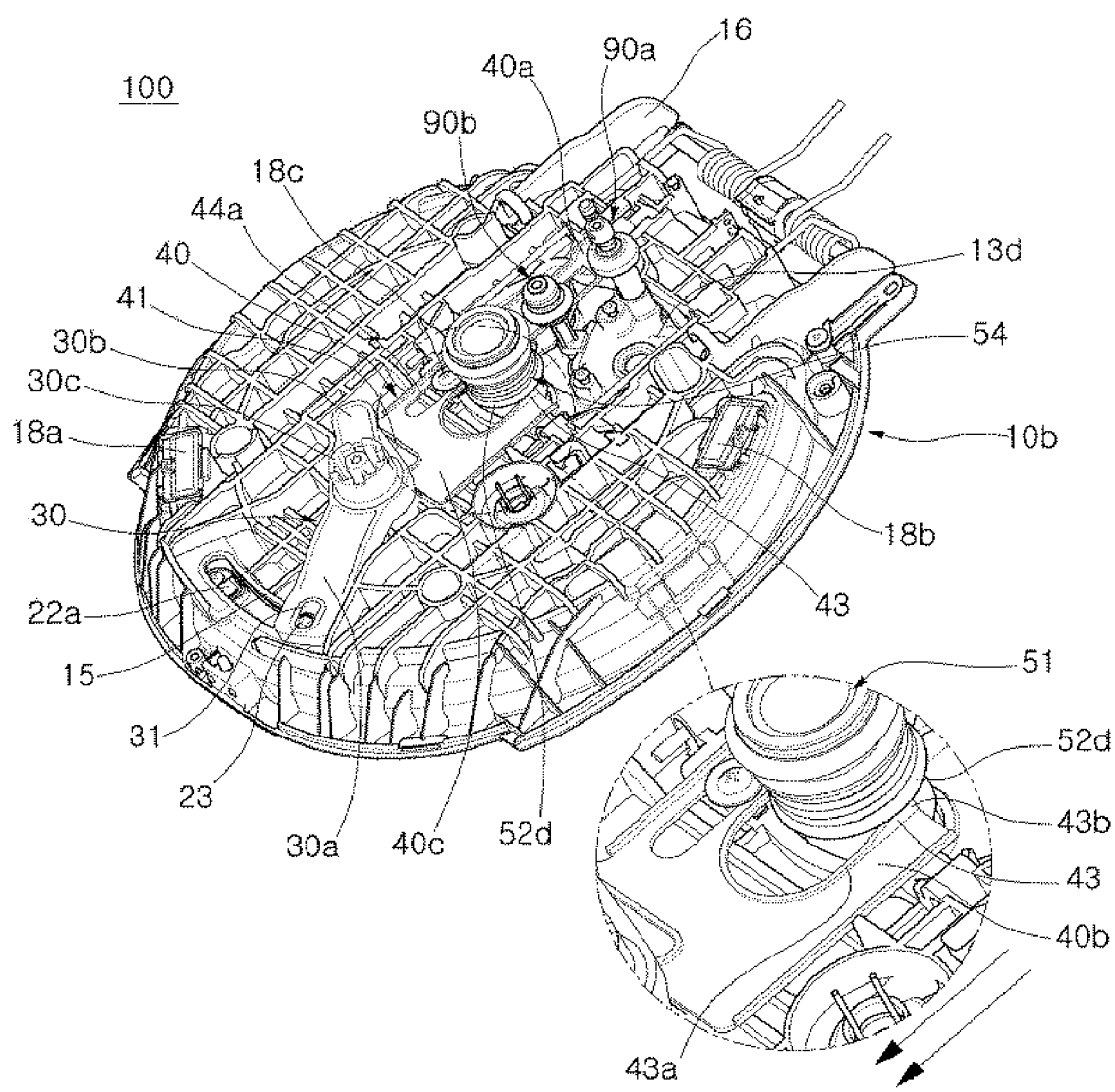
FIGS. 3A and 3B are perspective views showing opened and closed states of a pressure switching part of the electric cooker according to the present disclosure.
Figure 3B:
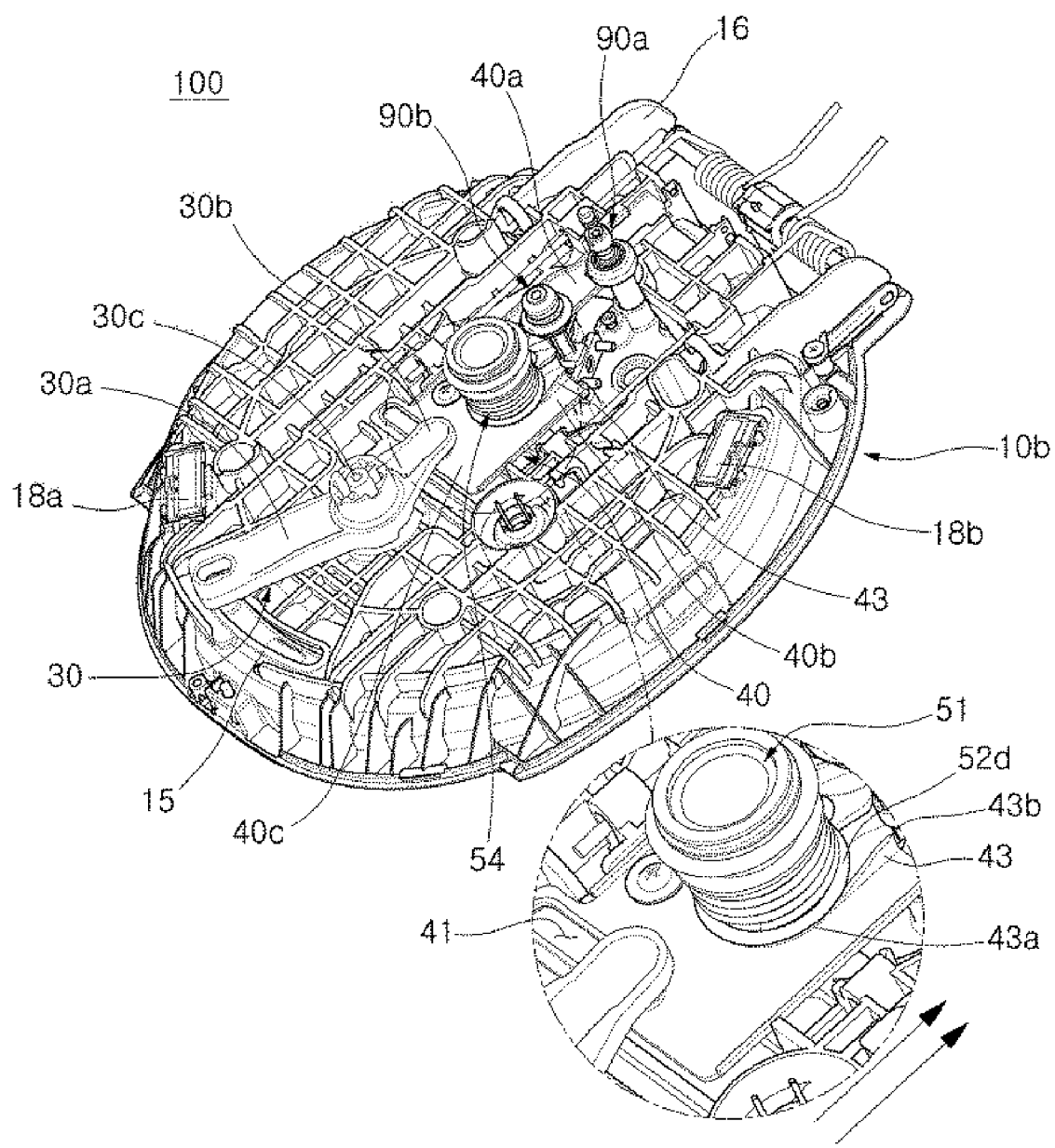
Figure 4A:
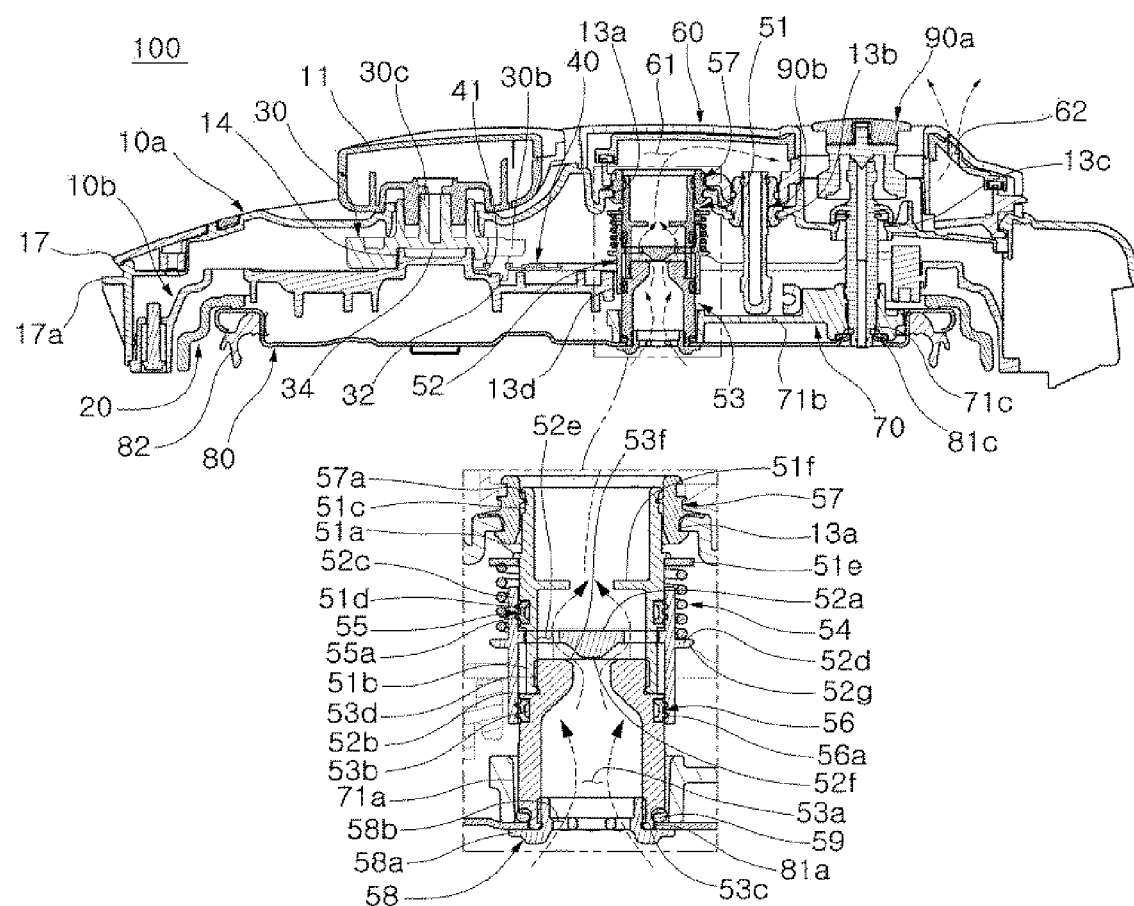
FIGS. 4A and 4B are sectional views showing the opened and closed states of the pressure switching part of the electric cooker according to the present disclosure.
Figure 4B:
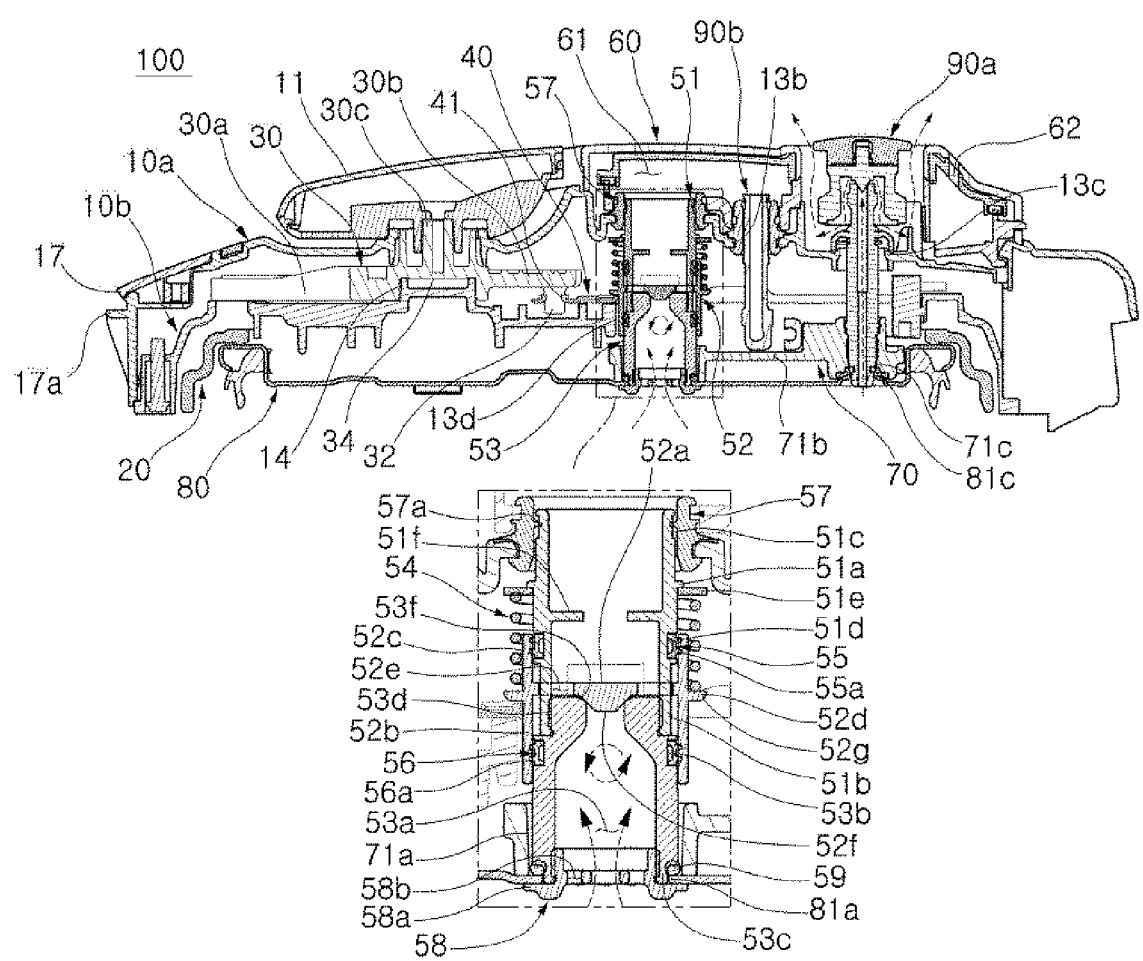

FIG. 2 is an exploded perspective view showing a lid of the electric cooker according to the present disclosure, FIGS. 3A and 3B are perspective views showing opened and closed states of a pressure switching part of the electric cooker according to the present disclosure, and FIGS. 4A and 4B are sectional views showing the opened and closed states of the pressure switching part of the electric cooker according to the present disclosure.

Figure 14:
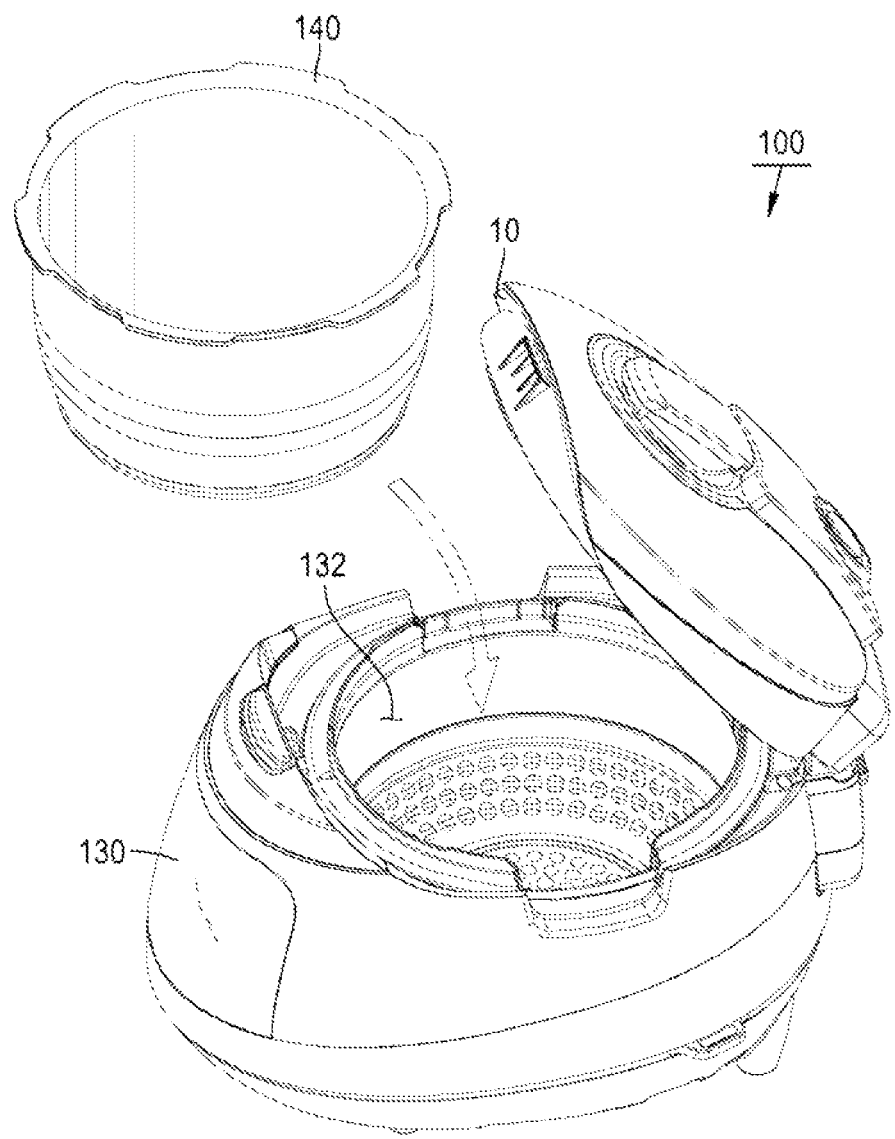
FIG. 14 is a perspective view showing a main body, an accommodation space, and an inner pot of the electric cooker according to the present disclosure.

Referring to FIG. 14, the electric cooker 100 according to the present disclosure includes a main body 130 having an accommodation space 132 therein, an inner pot 140 accommodated in the accommodation space of the main body, a lid 10 coupled to an upper portion of the main body to be opened and closed, a pressure-responsive operating part 90, and a pressure switching part 50. Referring to FIGS. 2 to 3A, the lid 10 is provided with an inner lid portion 10b coupled to the upper portion of the main body 130 to be opened and closed and an outer lid portion 10a covering the inner lid portion 10b and having a handle part 11 at one side of an upper surface thereof. Hereinafter, preferably, one side may be understood as a direction toward an open end 17 of the lid, while the other side may be understood as a direction toward a hinge connection portion 16 of the lid 10. The handle part 11 is provided to interwork with an inner pot locking part configured to lock the inner pot. Here, the inner pot locking part may be provided as a locking ring 20 rotatably coupled to a lower surface of the inner lid portion 10b and selectively locked to a flange portion depending on a rotation angle thereof, but the present disclosure is not limited thereto. For example, a plurality of locking protrusions 21 protrude radially inward from an inner periphery of the locking ring 20 to correspond to the flange portions, respectively.

Here, a handle base portion 30 is connected to a lower end of the handle part 11. In detail, the handle base portion 30 includes a support portion 30c as well as a locking ring interworking portion 30a and a lever interworking portion 30b which protrude from one end and the other end of the support portion 30c, respectively. In this case, the lower end of the handle part 11 is key-coupled to an upper surface of the support portion 30c, and a support protrusion 14 of the inner lid portion 10b is inserted into a rotation support groove 34 formed in a lower surface of the support portion 30c and rotatably supported therein. In addition, the locking ring interworking portion 30a extends to overlap with a rotational trace of the locking ring 20, and a connection hole 31 is formed to pass through one side of the locking ring interworking portion 30a overlapping with the locking ring 20. Here, a connection protrusion 23 protruding from an upper surface of the locking ring 20 is inserted and coupled into the connection hole 31 through an arc-shaped elongated hole 15 of the inner lid portion 10b.

Meanwhile, a lead plate 80 is coupled to a lower surface of the inner lid portion 10b and a sealing packing 82 configured to seal an upper opening of the inner pot 140 is provided on the lower surface of the lead plate 80. An inner pot cover may be further mounted on the lower surface of the lead plate 80, and in this case, the sealing packing 82 configured to seal the upper opening of the inner pot 140 may be provided on the edge of the inner pot cover. Here, a plurality of steam flow holes are formed to pass through the other side of the inner pot cover to discharge the steam inside the inner pot, and a plurality of communication holes 81a, 81b and 81c are formed to pass through the lead plate 80, facing the steam flow holes.

Further, a control plate 70 which collectively covers the communication holes 81a, 81b and 81c and which has mounting holes 71a, 71b and 71c formed to pass therethrough, corresponding to the communication holes 81a, 81b and 81c, is provided between the lead plate 80 and the inner lid portion 10b. In the meantime, a plurality of upper perforation portions 13a, 13b and 13c are formed in the other side of the outer lid portion 10a to respectively correspond to the mounting holes 71a, 71b and 71c, and a lower perforation portion 13d having a size capable of covering a region of each upper perforation portion 13a, 13b and 13c is formed in the inner lid portion 10b. Here, the pressure switching part 50 is arranged to pass through the lid 10 via one of the upper perforation portions 13a, 13b, and 13c and the lower perforation portion 13d, such that the opened or closed state for discharging the steam inside the inner pot can be selectively maintained.

In addition, the pressure-responsive operating part 90 is arranged to pass through the lid 10 via the remaining upper perforation portions 13b and 13c and lower perforation portion 13d where the pressure switching part 50 is not disposed, and the pressure-responsive operating part 90 includes a steam discharge part (e.g., solenoid valve) 90b that is opened and closed according to a control signal from the controller 120 and a pressure relief valve 90a having a weight that is vertically lifted according to the steam pressure inside the inner pot.

In turn, a mounting groove 12 is recessed in an upper surface of the outer lid portion 10a along the edges of the upper perforation portions 13a, 13b and 13c, and a steam cap portion 60 configured to guide the steam discharged from the pressure-responsive operating part 90 and the pressure switching part 50 may be detachably mounted in the mounting groove 12. Here, a weight receiving hole 63 configured to surround an outer periphery of the pressure relief valve 90a is formed in the other side of the steam cap portion 60, and a guide space 61 in which upper ends of the pressure switching part 50 and the steam discharge part 90b are disposed is formed therein. Here, the steam of the pressure switching part 50 and the steam discharge part 90b collides with flow control ribs (not shown) protruding into the guide space 61 and is discharged to the outside through a steam guide hole 62 formed in the other end of the guide space 61 while being decelerated.

Further, the main body 130 may be provided with an auxiliary locking part for locking a locking protrusion 17a protruding from the open end 17 of the lid 10. Thus, the closed state of the lid 10 can be stably maintained when the locking ring 20 is unlocked even in the non-pressure mode in which the pressure switching part 50 is opened.

Meanwhile, the pressure switching part 50 may preferably include a lower cylinder 53, a lifting piston 52, an upper cylinder 51, and a pressing part. Here, the lower cylinder 53 has a hollow cylindrical shape, with a pressure switching passage 53a formed therein to pass through the lower perforation portion 13d. A D-cut coupling portion 53c is formed at a lower end of the lower cylinder 53, and the communication hole 81a facing the lower cylinder 53 may be preferably provided as a D-cut hole having a D-cut section corresponding to the D-cut coupling portion 53c. Here, the D-cut coupling portion 53c is inserted into the D-cut hole in a state in which a sealing O-ring 59 is fitted onto the outer periphery of the D-cut coupling portion 53c, and a screw thread is formed on an inner periphery of the D-cut coupling portion 53c being inserted into the D-cut hole so that the D-cut coupling portion 53c can be screw-coupled with an outer periphery of a cylinder cap 58. In addition, a plurality of steam discharge holes 58b are formed to pass through the cylinder cap 58 to allow the steam in the inner pot to flow outward, and a fastening step 58a is formed along an outer periphery of the cylinder cap 58 to engage with a lower end edge of the D-cut hole. In this case, when the cylinder cap 58 is coupled to the D-cut coupling portion 53c, an edge of the D-cut hole is engaged between the fastening step 58a and a lower end of the lower cylinder 53 so that the lower cylinder 53 can be fixed, and a gap between the lower end of the lower cylinder 53 and the edge of the D-cut hole can be sealed by the sealing O-ring 59.

Moreover, the lifting piston 52 is movably coupled to an upper portion of the lower cylinder 53, and the pressure switching passage 53a is opened and closed as the lifting piston 52 vertically moves. Here, the lifting piston 52 includes a mounting plate portion 52a having a size greater than a size of the pressure switching passage 53a and mounted on an upper end of the lower cylinder 53 and also includes upper and lower slide tube portions 52c and 52b extending in the vertical direction from an outer end of the mounting plate portion 52a. In this case, a shielding protrusion 52f configured to shield the pressure switching passage 53a protrudes from a lower surface of the mounting plate portion 52a, and a plurality of arc-shaped switching discharge holes 52e, which are divided along an outer contour of the shielding protrusion 52f, are formed to pass through the lower surface of the mounting plate portion 52a.

Also, the upper cylinder 51 having a hollow cylindrical shape is arranged to pass through the upper perforation portion 13a. Here, a space between the upper cylinder 51 and the upper perforation portion 13a is sealed by a tubular sealing member 57, and a ring-shaped sealing groove 51c is recessed in an outer periphery of an upper end of the upper cylinder 51 so that a sealing protrusion 57a provided at an inner periphery of the tubular sealing member 57 can be hooked and supported in the ring-shaped sealing groove 51c. In addition, a plurality of arc-shaped column fastening portions 51b are provided at a lower end of the upper cylinder 51, and a screw thread is formed on inner peripheries of the column fastening portions 51b. As the column fastening portions 51b are fastened to a screw thread formed on an upper outer periphery 53d of the lower cylinder 53 by passing through the switching discharge holes 52e, the upper cylinder 51 can be fixed to the lower cylinder 53. Further, an anti-scattering plate 51f may protrude radially inward from an inner periphery of the upper cylinder 51.

In the meantime, the lower slide tube portion 52b has an inner diameter greater than an outer diameter of an upper portion of the lower cylinder 53 and the upper slide tube portion 52c has an inner diameter greater than an outer diameter of a lower portion of the upper cylinder 51, such that the lifting piston 52 may be mounted to surround an outer periphery of the lower cylinder 53 and an outer periphery of the upper cylinder 51.

In addition, ring-shaped sealing grooves 51d and 53b are recessed in a lower outer periphery of the upper cylinder 51 and an upper outer periphery of the lower cylinder 53 to mount the sealing members 55 and 56 therein. Here, a plurality of sealing ribs 55a and 56a may preferably protrude from outer peripheries of the sealing members 55 and 56.

Meanwhile, a lifting blade portion 52d may preferably protrude radially outward from an outer periphery of the lower slide tube portion 52b. In this case, the lifting blade portion 52d is pressed downward by the pressing part so that the pressure switching passage 53a can be maintained in a closed state. Here, the pressing part may be provided as an elastic member 54, such as a spring having an elastic modulus corresponding to the abnormal pressure so that the pressure switching passage 53a is forcibly opened above a predetermined abnormal pressure. More specifically, a spring support protrusion 51a protrudes from an outer periphery of the upper cylinder 51 and a washer member 51e having a size greater than a diameter of the elastic member 54 is attached to a lower end of the spring support protrusion 51a. As the elastic member 54 is interposed between the lifting blade portion 52d and the washer member 51e, the shielding protrusion 52f and the pressure switching passage 53a can be maintained in a close contact state.

In addition, a lift lever portion 40 is provided between the pressure switching part 50 and the handle base portion 30 to move linearly to one side and the other side corresponding to the rotation of the lever interworking portion 30b. More specifically, the lift lever portion 40 includes a connecting body portion 40c provided in a plate shape having an area covering a rotational trace of the lever interworking portion 30b, and first and second lever body portions 40a and 40b extending from the other end of the connecting body portion 40c to come into contact with both sides of an outer periphery of the pressure switching part 50. Here, the first lever body portion 40a and the second lever body portion 40b extend more than a linear movement distance of the lift lever portion 40 to maintain an overlap state with a lower surface of the lifting blade portion 52d during the linear movement. Then, an elongated guide hole 44a is formed to pass through one end of the first lever body portion 40a adjacent to the connecting body portion 40c. Here, when the screw member 18c is fastened to the inner lid portion 10b by passing through the elongated guide hole 44a, a washer member provided at a head portion of the screw member 18c supports an upper edge of the elongated guide hole 44a. Thus, an inner surface of the elongated guide hole 44a is guided along an outer periphery of the screw member 18c so that the lift lever portion 40 can move linearly to one side and the other side.

In addition, a crank hole 41 is formed to pass through the connecting body portion 40c such that an interworking protrusion 32 protruding from a lower end of the lever interworking portion 30b may be inserted into the crank hole 41, the crank hole 41 extending in a tangential direction from one end of a rotational trace of the interworking protrusion 32. Here, the rotational trace of the interworking protrusion 32 refers to a curve defined between a position of the interworking protrusion 32 when the locking ring 20 is locked and a position of the interworking protrusion 32 when the locking ring 20 is unlocked. The one end of the rotational trace may signify the position of the interworking protrusion 32 when the locking ring 20 is locked. Accordingly, when the handle base portion 30 is rotated, the interworking protrusion 32 moves in the transverse direction along the inside of the crank hole 41 while forming an arc and pulls one side edge of the crank hole 41 so that the lift lever portion 40 can move linearly to the one side. When the handle base portion 30 is rotated in reverse, the interworking protrusion 32 moves in the opposite direction while forming an arc and pushes the other side edge of the crank hole 41 so that the lift lever portion 40 can move linearly to the other side.

Further, a lift protrusion portion 43 protrudes from upper surfaces of the first lever body portion 40a and the second lever body portion 40b along an edge portion which is in contact with an outer periphery of the pressure switching part 50 when the lift lever portion 40 is moved linearly. Here, the lift protrusion portion 43 may be formed along a portion facing the lifting blade portion 52d when the lift lever portion 40 is moved linearly, and the lift protrusion portion 43 is preferably inclined upward in the linear movement direction when the handle part 11 is rotated to be locked.

As shown in FIGS. 3A and 4A, when the handle part 11 is rotated to be unlocked in a state in which the lift lever portion 40 is moved to the other side, the lift lever portion 40 is pulled to one side and the lifting blade portion 52d slides upward along an inclined surface of the lift protrusion portion 43. In turn, when the lifting blade portion 52d moving upward is supported by the uppermost step 43b of the lift protrusion portion 43, the pressure switching passage 53a can be completely opened and the opened state can be maintained. Here, the steam in the inner pot can be discharged to the outside through the steam flow holes, the steam discharge holes 58b, the communication holes 81a, the pressure switching passage 53a, the switching discharge holes 52e, a hollow of the upper cylinder 51, and the steam cap portion 60. Accordingly, the cooking can be performed in the non-pressure mode in which the steam in the inner pot is continuously discharged and the internal pressure of the inner pot is not increased.

As shown in FIGS. 3B and 4B, when the handle part 11 is rotated to be locked in a state in which the lift lever portion 40 has moved to one side, the lift lever portion 40 is pushed to the other side and the lifting blade portion 52d slides down along an inclined surface of the lift protrusion portion 43. When the lifting blade portion 52d faces the lowermost step 43a of the lift protrusion portion 43, upward pressure on the lifting blade portion 52d is released so that the lifting piston 52 moves downward and the pressure switching passage is completely closed. In this case, since the descended state of the lifting piston 52 is maintained by the pressing part 54, the steam in the inner pot flows to the pressure-responsive operating part 90 through the steam flow holes and is selectively discharged depending on the level of the internal pressure of the inner pot so that the internal pressure of the inner pot can be maintained at a constant level. That is, since the internal pressure of the inner pot is increased in a state in which the pressure switching part 50 is closed, the cooking can be performed in the high-pressure mode. When the internal pressure of the inner pot is increased higher than a predetermined level, or when the pressure-responsive operating part 90 is opened under the control of the controller 120, the steam in the inner pot can be discharged to the outside through the steam flow holes, the pressure-responsive operating part 90, and the steam cap portion 60.

Meanwhile, the locking ring 20 may have a pair of markers 22a and 22b which are spaced apart from each other in a locking direction and an unlocking direction to inform a user of the rotation direction. Here, the markers 22a and 22b may be provided as permanent magnets, and at least one or more first and second magnetic sensors 18a and 18b are provided on an upper surface of the inner lid portion 10b corresponding to the rotational trace of the markers 22a and 22b, respectively, to sense the magnetic force of the markers 22a and 22b. The first magnetic sensor 18a is arranged corresponding to the position of the first marker 22a located in the locking rotation direction of the locking ring 20 when the locking ring 20 is locked, and the second magnetic sensor 18b is arranged corresponding to the position of the second marker 22b located in the unlocking rotation direction of the locking ring 20 when the locking ring 20 is unlocked. When the locking ring 20 is locked, the first magnetic sensor 18a senses the magnetic force of the first marker 22a and transmits a first sensing signal to the controller 120, and when the locking ring 20 is unlocked, the second magnetic sensor 18b senses the magnetic force of the second marker 22b and transmits a second sensing signal to the controller 120.

As described above, the electric cooker includes a first discharge path defined to pass through the gap between the inside of the inner pot (or the accommodation space) and the outside of the main body (or the lid), which is composed of the steam flow holes, the steam discharge holes 58b, the communication holes 81a, the pressure switching passage 53a, the switching discharge holes 52e, the hollow of the upper cylinder 51, and the steam cap portion 60 and a second discharge path composed of the steam flow holes and the pressure-responsive operating part 90 and defined to pass through and to block the gap between the inside of the inner pot (or the accommodation space) and the outside of the main body by the operation of the pressure-responsive operating part 90 (or the opening or closing operation). Here, the pressure conversion part serves to selectively discharge the steam inside the inner pot to the first discharge path or the second discharge path by selectively opening and closing the first discharge path and the second discharge path. This pressure conversion part includes the handle part 11 provided on the lid 10, the locking ring 20, the handle base portion 30, the lift lever portion 40, and the pressure switching part 50, and the pressure switching passage 53a is opened and closed by a series of operations of these components, the opening (complete opening) of the pressure switching passage 53a corresponding to the non-pressure mode (selection of the first discharge path), the closing (complete closing) of the pressure switching passage 53a corresponding to the high-pressure mode (selection of the second discharge path).

The above-described pressure conversion part shows a case in which the first discharge path and the second discharge path are individually formed. However, the pressure conversion part may be configured such that the first discharge path for the non-pressure mode and the second discharge path for the high-pressure mode are arranged in multiple stages in series, sharing a certain space. In this arrangement of serial multiple stages, it is possible to select the high-pressure mode and the non-pressure mode according to the opening and closing operations of the first and second discharge paths, respectively. For example, when the first discharge path for the non-pressure mode is opened, the non-pressure mode is performed, and when the second discharge path for the high-pressure mode is opened, the high-pressure mode is performed. On the contrary, when the second discharge path for the high-pressure mode is closed, the non-pressure mode is performed, and when the second discharge path for the high-pressure mode is opened, the high-pressure mode is performed. Therefore, the pressure conversion part includes a mechanism for selecting the high-pressure mode and the non-pressure mode by opening and closing the plurality of discharge paths that are arranged individually or in multiple stags in series and configured to pass through and to block the gap between the inside of the inner pot (or the accommodation space) and the outside of the main body.

Figure 5:
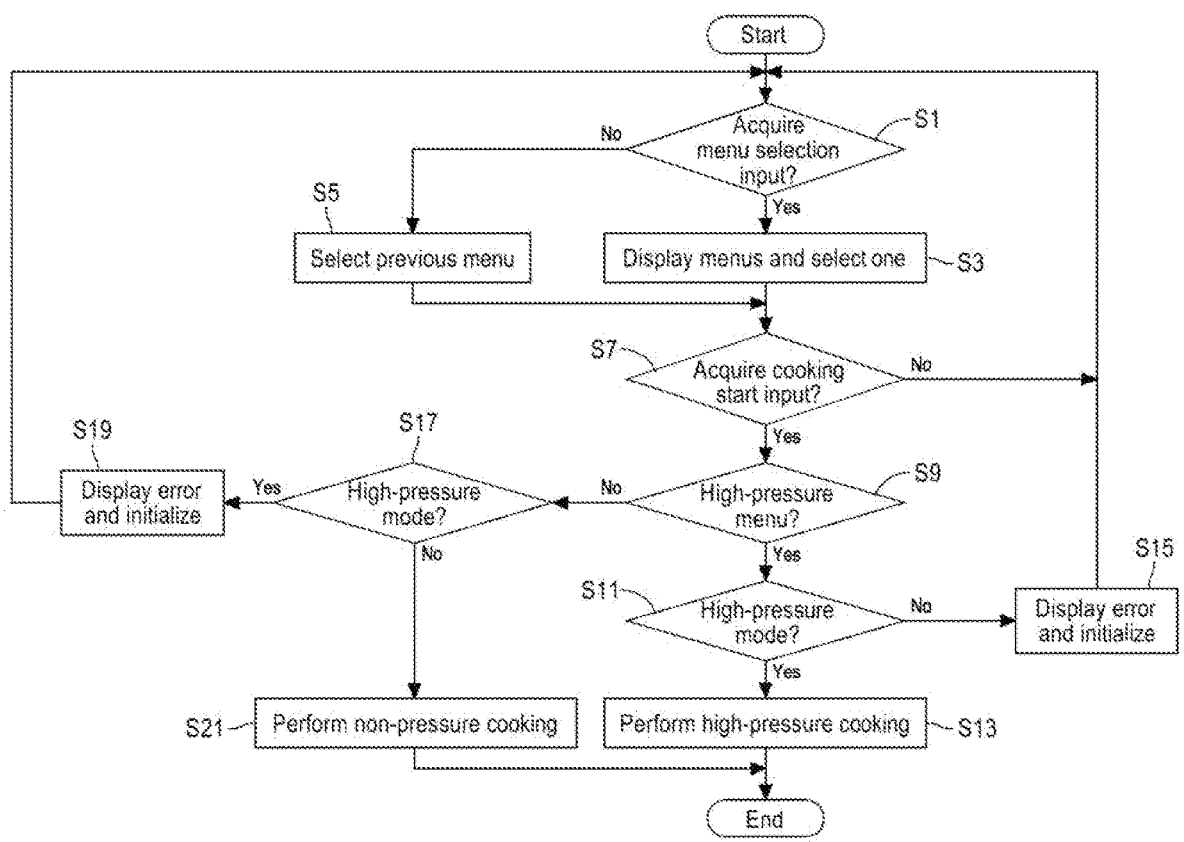
FIG. 5 is a flowchart showing sequential steps of a method of controlling the electric cooker of FIG. 1.

FIG. 5 is a flowchart showing sequential steps of a method of controlling the electric cooker of FIG. 1. In this embodiment, only the first magnetic sensor 18a is provided. The process starts when power is supplied to the respective components through the power supply part 110. The controller 120 determines a pressure mode of the pressure conversion part based on the first sensing signal from the first magnetic sensor 18a and causes it to be displayed on the display part 114 (or the sub-display part). For example, when the controller 120 receives the first sensing signal from the first magnetic sensor 18a, the high-pressure mode is displayed on the display part 114, and when the controller 120 does not receive the first sensing signal from the first magnetic sensor 18a, the non-pressure mode is displayed on the display part 114.

In step S1, the controller 120 determines whether a menu selection input has been acquired from the input part 112. If the menu selection input has been acquired, the process goes to step S3, and if not, the process goes to step S5.

In step S3, the controller 120 causes the prestored menus to be displayed on the display part 114 and allows the user to select a desired menu through the input part 112. When the user finishes the menu selection, the process goes to step S7.

In step S5, the controller 120 decides the prestored menu (the one previously cooked and stored in the controller 120) or the preselected menu as the menu for the current cooking process, since there is no menu selection input from the user.

In step S7, the controller 120 determines whether a cooking start input for the menu selected in step S3 or step S5 has been acquired from the input part 112. If the cooking start input has been acquired, the process goes to step S9, and if not, the process goes back to step S1 for the menu selection.

In step S9, the controller 120 determines whether the menu selected in step S3 or step S5 is a high-pressure menu. The high-pressure menu is a menu to be cooked in the high-pressure mode, while the non-pressure menu is a menu to be cooked in the non-pressure mode. Example high-pressure menus include white rice, grains, rice crusts, brown rice/germinated rice, chicken soups with *ginseng*, and high-pressure steamed dishes, and example non-pressure menus include non-pressure white rice, baby food, non-pressure steamed dishes, and rice porridges. If the menu selected in step S3 or step S5 is the high-pressure menu, the process goes to step S11, and if the menu selected in step S3 or step S5 is the non-pressure menu, the process goes to step S17.

In step S11, the controller 120 determines whether the current pressure mode of the pressure conversion part is the high-pressure mode. If the current pressure mode is the high-pressure mode, the process goes to step S13, and if not, the process goes to step S15.

In step S13, since the selected menu is the high-pressure menu and the current pressure mode is the high-pressure mode, the controller 120 controls the heating part 19*c* and the steam discharge part 90*b* to perform the high-pressure cooking based on the sensing temperature from the temperature sensing part 116 according to the high-pressure cooking algorithm corresponding to the selected menu. By performing the high-pressure cooking, the controller 120 provides the user with the cooked food having a unique chewy texture of the high-pressure cooking.

In step S15, since the selected menu is the high-pressure menu and the current pressure mode is the non-pressure mode, the controller 120 causes the display part 114 to visually or audibly display an error that the selected high-pressure menu cannot be cooked in the current non-pressure mode (i.e., the selected menu does not correspond to the current pressure mode) and goes back to step S1 to initialize the previous menu selection and allow the user to select a menu again. By displaying the error and performing the menu selection again, the controller 120 causes the desired menu of the user to be precisely performed in the suitable pressure mode. However, in step S15, instead of directly going back to step S1, the controller 120 may guide the user to change the pressure mode to the high-pressure mode, with the display of the error, and determine whether the current pressure mode is changed to the high-pressure mode for a reference time, i.e., whether the current pressure mode is the pressure mode corresponding to the high-pressure menu for a reference time. If the controller 120 determines that the current pressure mode has been changed to the high-pressure mode within the reference time, i.e., if the current pressure mode corresponds to the selected menu, the process goes to step S13, and if not, the process goes back to step S1 so that the controller 120 can initialize the previous menu selection and allow the user to select a menu again.

In step S17, the controller 120 determines whether the current pressure mode of the pressure conversion part is the high-pressure mode. If the current pressure mode is the high-pressure mode, the process goes to step S19, and if not, the process goes to step S21.

In step S19, since the menu selected by the user is the non-pressure menu and the current pressure mode is the high-pressure mode, the controller 120 causes the display part 114 to visually or audibly display an error that the selected non-pressure menu cannot be cooked in the current high-pressure mode (i.e., the selected menu does not correspond to the current pressure mode) and goes back to step S1 to initialize the previous menu selection and allow the user to select a menu again. By displaying the error and performing the menu selection again, the controller 120 causes the desired menu of the user to be precisely performed in the suitable pressure mode. However, in step S19, instead of going back to step S1, the controller 120 may visually or audibly guide the user to change the pressure mode to the non-pressure mode, with the display of the error, and determine whether the current pressure mode is changed to the non-pressure mode for a reference time, i.e., whether the current pressure mode is the pressure mode corresponding to the non-pressure menu for a reference time. If the controller 120 determines that the current pressure mode has been changed to the non-pressure mode within the reference time, i.e., if the current pressure mode corresponds to the selected menu, the process goes to step S21, and if not, the process goes back to step S1 so that the controller 120 can initialize the previous menu selection and allow the user to select a menu again.

In step S21, since the selected menu is the non-pressure menu and the current pressure mode is the non-pressure mode, the controller 120 controls the heating part 19*c* to perform the non-pressure cooking based on the sensing temperature from the temperature sensing part 116 according to the non-pressure cooking algorithm corresponding to the selected menu. By performing the non-pressure cooking, the controller 120 provides the user with the cooked food having a unique soft texture of the non-pressure cooking.

In the process of the aforementioned steps S9, S11 and S17, the controller 120 firstly determines whether the menu selected by the user is the high-pressure menu, and then determines whether the current pressure mode is the high-pressure mode, but other embodiments are also possible. For example, the controller 120 may firstly determine whether the current pressure mode is the high-pressure mode (or the non-pressure mode) and then determine whether the selected menu is the high-pressure menu (or the non-pressure menu). In further embodiments, the controller 120 may firstly determine whether the menu selected by the user is the non-pressure menu and then determine whether the current pressure mode is the non-pressure mode.

In addition, when only the second magnetic sensor 18*b* is provided, instead of the first magnetic sensor 18*a* described above, the respective sequential steps of the flowchart of FIG. 5 may be performed in the same manner. However, the controller 120 only has to determine whether the selected menu is the non-pressure menu in step S9, determine whether the current pressure mode is the non-pressure mode in steps S11 and S17, perform the non-pressure cooking in step S13, and perform the high-pressure cooking in step S21.

Figure 6:
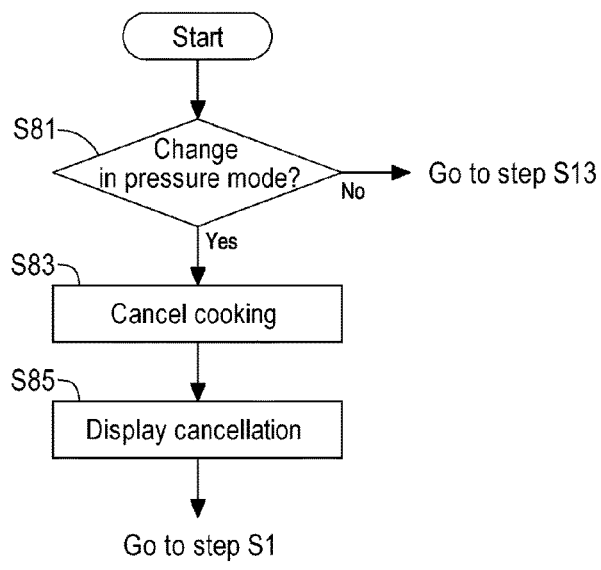
FIG. 6 is a flowchart showing sequential steps of a control process when there is a change in pressure mode during the cooking process of FIG. 5.

FIG. 6 is a flowchart showing sequential steps of a control process when there is a change in pressure mode during the cooking process of FIG. 5. Since the pressure mode of the pressure conversion part may be changed by the user, the controller 120 performs the control process of FIG. 6 while performing steps S13 and S21 of FIG. 5.

In step S81, the controller 120 determines whether there is a change in current pressure mode while performing step S13 (or step S21). For the purpose of this determination, the controller 120 determines whether there is a change in reception and non-reception states of the first sensing signal in the current pressure mode. If there is a change in current pressure mode, the process goes to step S83, and if not, since there is no change in position of the handle part 11 or there is no rotation thereof, the process goes to step S13 (or step S21).

In step S83, since the current pressure mode has been changed and the changed current pressure mode does not correspond to the selected menu, the controller 120 cancels the cooking being currently performed and interrupts the heating operation of the heating part 19c. The controller 120 performs step S83 and goes to step S85.

In step S85, the controller 120 informs the user that there has been a change in current pressure mode during the cooking process and causes the display part 114 to visually or audibly display the cancellation of the cooking being currently performed. The controller 120 goes back to step S1 so that the user can change the pressure mode or menu to correspond to the current pressure mode and menu after step S85.

In steps S83 and S85, while the cooking is being performed according to the non-pressure mode algorithm or the high-pressure mode algorithm, if the pressure mode is changed, in particular, from the high-pressure mode to the non-pressure mode, there is a risk of suddenly discharging the steam inside the inner pot to the outside and causing a burn to the user, and thus the controller 120 should preferably cancel the cooking. In addition, due to the change in pressure mode, the selected menu does not correspond to the changed current pressure mode, and the quality of food to be cooked may be reduced because the food cooked according to the algorithm corresponding to the previous pressure mode until the time of changing is to be cooked according to the algorithm corresponding to a different pressure mode, as a result of which the controller 120 should preferably cancel the cooking.

Figure 7:
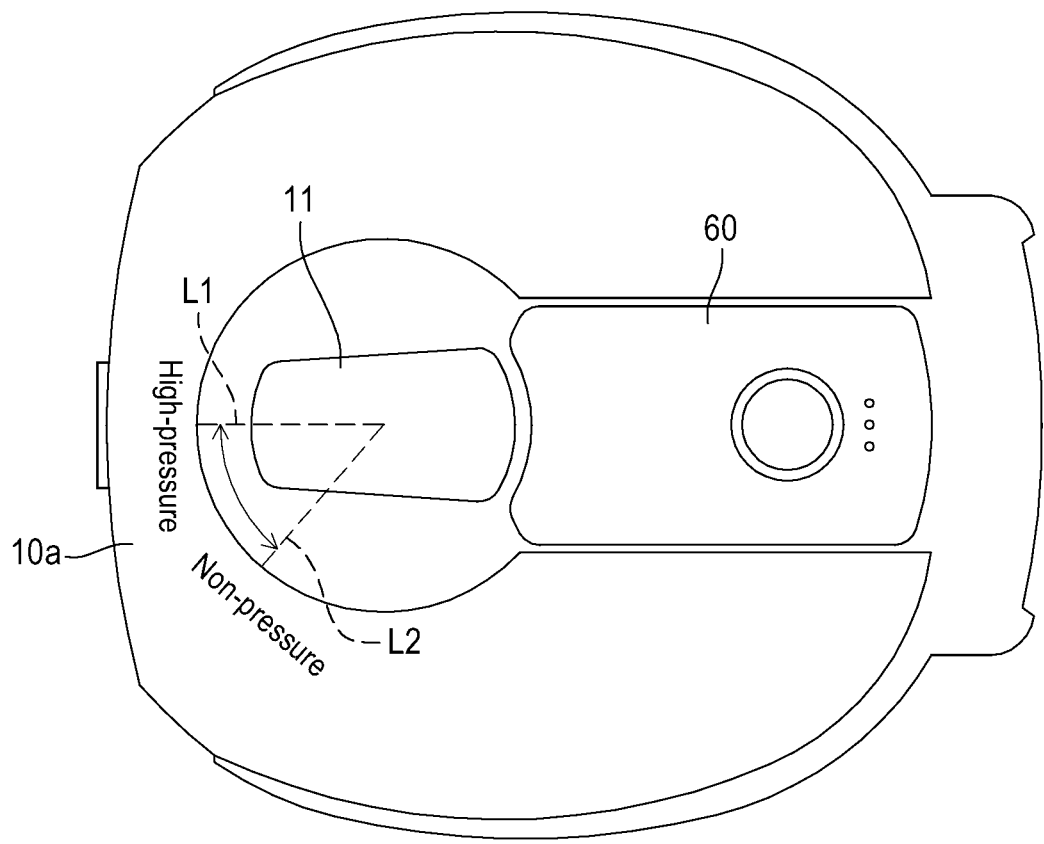
FIG. 7 is a plan view showing the lid of the electric cooker according to the present disclosure.

FIG. 7 is a plan view showing the lid of the electric cooker according to the present disclosure. FIGS. 5 and 6 show a case where only the first magnetic sensor 18a is provided, while FIGS. 7 to 13 show a case where the first and second magnetic sensors 18a and 18b are provided. As shown in FIG. 7, placing the handle part 11 in a position L1 selects the second discharge path in the high-pressure mode, and placing the handle part 11 in a position L2 selects the first discharge path in the non-pressure mode. However, depending on the rotation angle of the handle part 11, placing the handle part 11 between the positions L1 and L2 (intermediate position) can maintain the pressure switching passage 53a to be partially opened or closed. In this intermediate position, the controller 120 cannot receive a sensing signal from either the first magnetic sensor 18a or the second magnetic sensor 18b, and thus the controller 120 can determine that the handle part 11 is placed in the intermediate position, based on the non-reception of the sensing signal.

Table 1 shows at least four modes which the controller 120 can determine based on the reception or non-reception of the first and second sensing signals from the first and second magnetic sensors 18a and 18b.

TABLE 1

| Mode | First sensing signal | Second sensing signal | Determination |
| --- | --- | --- | --- |
| 1 | Reception | Non-reception | High-pressure mode |
| 2 | Non-reception | Reception | Non-pressure mode |
| 3 | Non-reception | Non-reception | Error mode |
| 4 | Reception | Reception | Failure mode |

In the fourth mode, the controller 120 receives both the first and second sensing signals, where one of the first and second magnetic sensors 18a and 18b is short-circuited and the other one is normal, or both the first and second magnetic sensors 18a and 18b are short-circuited. The controller 120 determines the fourth mode as a failure mode.

In the third mode, the controller 120 does not receive both the first and second sensing signals, where the handle part 11 is in the intermediate position, or both the first and second magnetic sensors 18a and 18b are short-circuited, regardless of the position of the handle part 11. The controller 120 determines the third mode as an error mode.

In the second mode, the controller 120 does not receive the first sensing signal and receives the second sensing signal, where both the first and second magnetic sensors 18a and 18b are normal, or the first magnetic sensor 18a is short-circuited and the second magnetic sensor 18b is normal, or the first magnetic sensor 18a is normal and the second magnetic sensor 18b is short-circuited. The controller 120 determines the second mode as a non-pressure mode.

In the first mode, the controller 120 receives the first sensing signal and does not receive the second sensing signal, where both the first and second magnetic sensors 18a and 18b are normal, or the first magnetic sensor 18a is normal and the second magnetic sensor 18b is short-circuited, or the first magnetic sensor 18a is short-circuited and the second magnetic sensor 18b is normal. The controller 120 determines the first mode as a high-pressure mode.

It is to be understood that the pressure modes in this embodiment include the error mode and the failure mode as well as the high-pressure mode and the non-pressure mode determined by the controller 120 through the first and second sensing signals. That is, the controller may determine at least one electrical state (short circuit state and/or disconnection state) of the first and second magnetic sensors 18a and 18b as well as the high-pressure mode and the non-pressure mode, using reception and non-reception of the first and second sensing signals.

Figure 8:
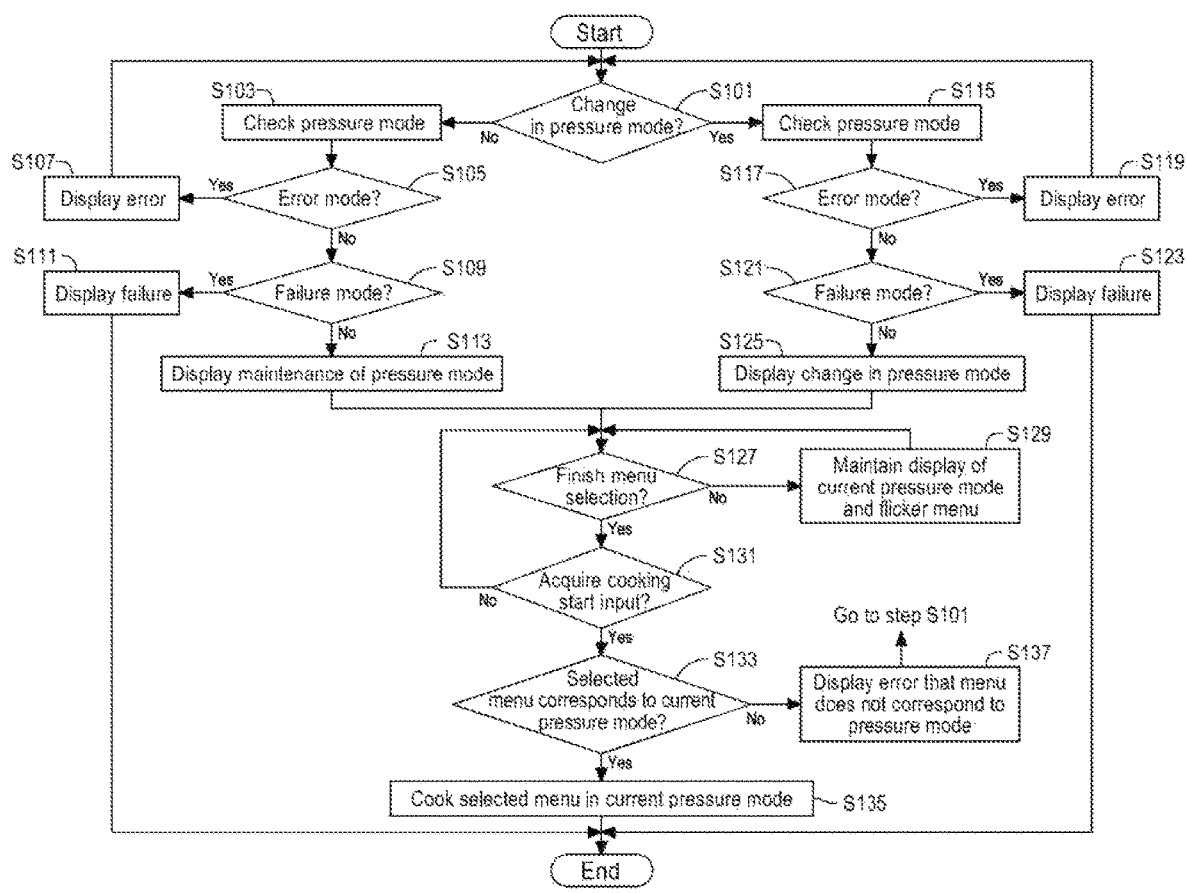
FIG. 8 is a flowchart showing sequential steps of a method of controlling the electric cooker of FIG. 1 according to another embodiment.

FIG. 8 is a flowchart showing sequential steps of a method of controlling the electric cooker of FIG. 1 according to another embodiment. The control method of the present disclosure starts when power is supplied to the respective components through the power supply part 110.

In step S101, the controller 120 determines whether there is a change in current pressure mode. For the purpose of this determination, the controller 120 determines whether there is a change in reception and non-reception states of the first and second sensing signals in the current pressure mode. If there is a change in current pressure mode, the process goes to step S115, and if not, since there is no change in position of the handle part 11 or there is no rotation thereof, the process goes to step S103.

In step S103, the controller 120 determines the current pressure mode by checking the reception and non-reception states of the first and second sensing signals. The current pressure mode corresponds to one of the four modes in Table 1. The controller 120 performs step S103 and then goes to step S105.

In step S105, the controller 120 determines whether the current pressure mode is the error mode. If the current pressure mode is the error mode, the process goes to step S107, and if not, the process goes to step S109.

In step S107, the controller 120 causes the display part 114 to visually or audibly display an error that the position of the handle part 11 is not the high-pressure or non-pressure position but the intermediate position or that the position of the handle part 11 should be changed to the high-pressure or non-pressure position. Here, the controller 120 can ignore or discard the input from the input part 112 to cause the user to manipulate the handle part 11, the process of ignoring or discarding the input being ended when the current pressure mode is determined as the high-pressure mode or the non-pressure mode. By step S107, the controller 120 allows the user to operate the electric cooker in the high-pressure mode or the non-pressure mode, which makes it possible to perform the high-pressure cooking or the non-pressure cooking when the controller 120 mechanically determines that the high-pressure mode or the non-pressure mode is stable. The controller 120 performs step S107 and then goes back to step S101.

In step S109, the controller 120 determines whether the current pressure mode is the failure mode. If the current pressure mode is the failure mode, the process goes to step S111, and if not, since the current pressure mode is the high-pressure mode or the non-pressure mode, the process goes to step S113.

In step S111, the controller 120 causes the display part 114 to visually or audibly display the failure of the electric cooker (the first and second magnetic sensors 18a and 18b). In addition, the controller 120 ignores or discards the input from the input part 112 not to perform any control operation, for the user's safety.

In step S113, the controller 120 causes the display part 114 to visually or audibly display the maintenance of the high-pressure mode or the non-pressure mode, which is the current pressure mode, to inform the user of the current pressure mode and draw the user's attention. The controller 120 causes the high-pressure mode and the non-pressure mode to be displayed differently, when they are the current pressure mode. For example, when the current pressure mode is maintained as the high-pressure mode, the controller 120 causes the most recently performed high-pressure menu and the indication such as [high-pressure] to be turned on, for example, in red on the display part 114 and also causes the indication such as [high-pressure] to be turned on in red on the lower display portion. On the contrary, when the current pressure mode is maintained as the non-pressure mode, the controller 120 causes the most recently performed non-pressure menu and the indication such as [non-pressure] to be turned on, for example, in blue on the display part 114 and also causes the indication such as [non-pressure] to be turned on in blue on the lower display portion. The controller 120 performs step S113 and then goes to step S127.

In step S115, the controller 120 determines the changed pressure mode by checking the reception and non-reception states of the first and second sensing signals, and the determined pressure mode (i.e., the changed pressure mode) is recognized as the current pressure mode. The controller 120 performs step S115 and then goes to step S117.

In steps S117 to S123, the controller 120 is operated in the same manner as steps S105 to S111, respectively.

In step S125, the controller 120 causes the display part 114 to visually or audibly display the change in the high-pressure mode or the non-pressure mode, which is the current pressure mode, to inform the user of the current pressure mode and draw the user's attention. The controller 120 causes a change from the non-pressure mode to the high-pressure mode and a change from the high-pressure mode to the non-pressure mode to be displayed differently. For example, when the current pressure mode is changed from the non-pressure mode to the high-pressure mode, the controller 120 causes the high-pressure menus to be flickered and the non-pressure menus to be turned on for a certain time to cause the display part 114 to visually or audibly display the change to the high-pressure mode, then causes only the most recently performed high-pressure menu to be flickered and the other high-pressure menus to be turned on, and causes the indication such as [high-pressure] to be turned on, for example, in red on the display part 114 and also causes the indication such as [high-pressure] to be turned on in red on the lower display portion. On the contrary, when the current pressure mode is changed from the high-pressure mode to the non-pressure mode, the controller 120 causes the non-pressure menus to be flickered and the high-pressure menus to be turned on for a certain time to cause the display part 114 to visually or audibly display the change to the non-pressure mode, then causes only the most recently performed non-pressure menu to be flickered and the other non-pressure menus to be turned on, and causes the indication such as [non-pressure] to be turned on, for example, in blue on the display part 114 and also causes the indication such as [non-pressure] to be turned on in blue on the lower display portion. The controller 120 performs step S125 and then goes to step S127.

In step S127, the controller 120 determines whether a menu selection confirmation input for the menu selected by the user has been acquired from the input part 112 to determine whether the user finishes the menu selection. Here, the controller 120 allows the user to select one of the entire menus, regardless of the current pressure mode (i.e., the high-pressure menus and the non-pressure menus). If the menu selection confirmation input is not acquired and the menu selection is not finished, the process goes to step S129, and if not, the process goes to step S131.

In step S129, the controller 120 maintains the current pressure mode to be displayed and causes the high-pressure menus and the non-pressure menus to be sequentially flickered according to the menu selection input from the input part 112. For example, when the current pressure mode is the high-pressure mode, the controller 120 causes the most recently performed high-pressure menu to be flickered and the other high-pressure menus and non-pressure menus to be turned on. Whenever acquiring the menu selection input from the input part 112, the controller 120 causes the flickering state of the most recently performed high-pressure menu to be sequentially moved to another high-pressure menus and the non-pressure menus.

Additionally, in step S127, if the menu selection confirmation input is acquired, the controller 120 determines and stores the menu flickered at the time of acquiring as the menu selected by the user.

In step S131, the controller 120 determines whether a cooking start input has been acquired from the input part 112. If the cooking start input has been acquired, the process goes to step S133, and if not, the process goes back to step S127. Alternatively, the controller 120 goes from step S131 to step S129 or repeatedly performs step S131 until the cooking start input is acquired. When the controller 120 goes from step S131 to step S127 or step S129, if the controller 120 additionally acquires a menu selection input and a menu selection confirmation input from the input part 112, the controller 120 can store another menu as the menu selected by the user, instead of the preselected menu. For example, when the chicken soup with *ginseng*, which is the preselected menu, is changed to the high-pressure steamed dish, the controller 120 stores the high-pressure steamed dish as the menu selected by the user, instead of the chicken soup with *ginseng*.

In step S133, the controller 120 determines whether the menu selected by the user corresponds to the current pressure mode. That is, when the selected menu is the high-pressure menu and the current pressure mode is the high-pressure mode, or when the selected menu is the non-pressure menu and the current pressure mode is the non-pressure mode, the controller 120 determines that the selected menu corresponds to the current pressure mode. If the menu selected by the user corresponds to the current pressure mode, the process goes to step S135, and if not, the process goes to step S137.

In step S135, the controller 120 controls the heating part 19c and/or the steam discharge part 90b to cook the selected menu in the current pressure mode based on the sensing temperature from the temperature sensing part 116. For example, in the case of the high-pressure mode, the controller 120 controls the heating part 19c and/or the steam discharge part 90b to perform the high-pressure cooking based on the sensing temperature from the temperature sensing part 116 according to the high-pressure cooking algorithm corresponding to the selected menu. By performing the high-pressure cooking, the controller 120 provides the user with the cooked food having a unique chewy texture of the high-pressure cooking. On the contrary, in the case of the non-pressure mode, the controller 120 controls the heating part 19c to perform the non-pressure cooking based on the sensing temperature from the temperature sensing part 116 according to the non-pressure cooking algorithm corresponding to the selected menu. By performing the non-pressure cooking, the controller 120 provides the user with the cooked food having a unique soft texture of the non-pressure cooking. The controller 120 performs step S135 and then ends the entire control process.

In step S137, the controller 120 causes the display part 114 to visually or audibly display an error that the selected menu does not correspond to the current pressure mode. That is, when the selected menu is the high-pressure menu and the current pressure mode is the non-pressure mode, or when the selected menu is the non-pressure menu and the current pressure mode is the high-pressure mode, if the controller 120 performs the cooking, the user cannot be provided with the desired quality of food. Therefore, the controller 120 informs the user of such an error and goes back to step S101 so that the user can change the pressure mode or the menu.

Steps S101 to S125 described above may be referred to as a menu display process, steps S127 to S129 described above may be referred to as a menu selection process, and steps S131 to S137 described above may be referred to as a cooking process.

In the above embodiment, in steps S127 to S129, the controller 120 causes all the menus to be displayed, regardless of the current pressure mode, and allows the user to select one of the menus (hereinafter, 'the first menu display and selection method'). When the first menu display and selection method is applied, the controller 120 should perform steps S133 to S137.

In addition, with a second menu display and selection method, in step S127, the controller 120 may cause only the menus corresponding to the current pressure mode among the plurality of menus to be selected. That is, when the controller 120 determines the current pressure mode as the high-pressure mode, the controller 120 allows the user to select only the menus corresponding to the high-pressure mode through the display part 114. For the implementation of the second menu display and selection method, in step S127, the controller 120 may cause the most recently performed menu among the menus corresponding to the current pressure mode to be flickered, only the menus corresponding to the current pressure mode, other than the flickered menu, to be turned on, and the menus of another pressure mode to be turned off, which is a first display method, or the controller 120 may cause the most recently performed menu among the menus corresponding to the current pressure mode to be flickered and all the menus other than the flickered menu (high-pressure and non-pressure menus) to be turned on, on the display part 114, which is a second display method. However, in the second menu display and selection method, the controller 120 can perform the display according to the first or second display method described above and cause only the menus corresponding to the current pressure mode to be selected. In step S129, the controller 120 maintains the current pressure mode to be displayed and causes only the menus corresponding to the current pressure mode to be sequentially flickered according to the menu selection input from the input part 112. Here, the controller 120 maintains the display of the menus other than the flickered menu in the same manner according to the first or second display method. For example, when the current pressure mode is the high-pressure mode and the first display method is applied, the controller 120 causes the most recently performed high-pressure menu to be flickered, only the other high-pressure menus to be turned on, and the non-pressure menus to be turned off. Whenever acquiring the menu selection input from the input part 112, the controller 120 causes the flickering state of the most recently performed high-pressure menu to be sequentially moved only to another high-pressure menus. As another example, when the current pressure mode is the non-pressure mode and the second display method is applied, the controller 120 causes the most recent non-pressure menu to be flickered and all the menus other than the flickered non-pressure menu to be turned on. Whenever acquiring the menu selection input from the input part 112, the controller 120 causes the flickering state of the most recently performed non-pressure menu to be sequentially moved only to another non-pressure menus. Further, when the controller 120 performs the second menu display and selection method, it does not have to perform steps S133 and S137. When acquiring the cooking start input in step S131, the controller 120 goes to step S135 to cook the selected menu corresponding to the current pressure mode.

Figure 9A:
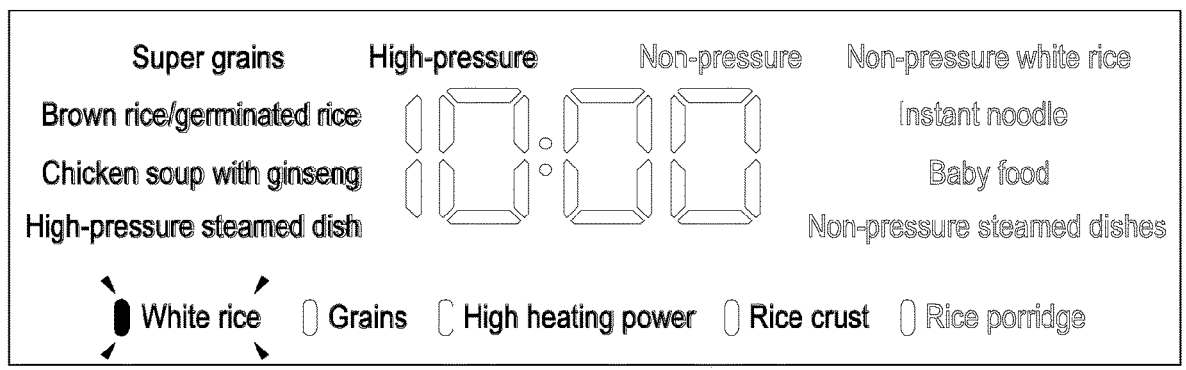
FIGS. 9A and 9B show examples displayed to the user through a display part 114.
Figure 9B:
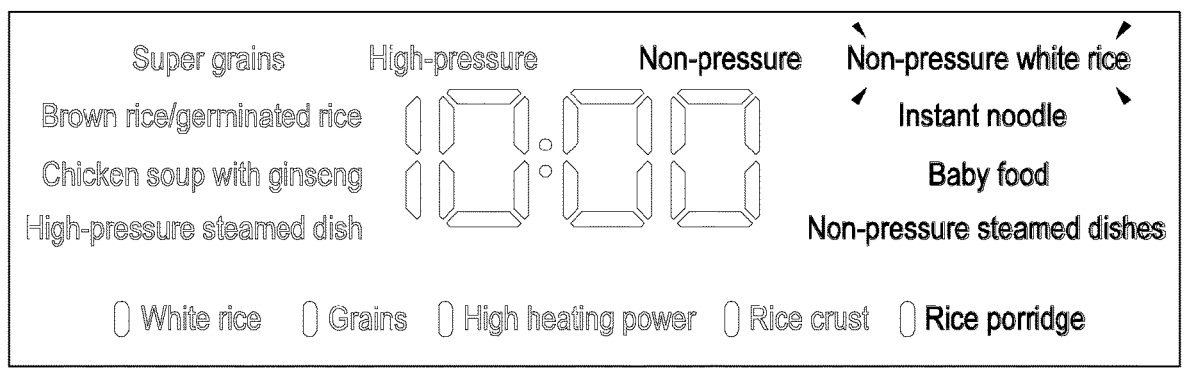

FIGS. 9A and 9B show examples displayed to the user through the display part 114. In FIGS. 9A and 9B, the first display method of the second menu display and selection method has been applied.

In FIG. 9A, the controller 120 causes the high-pressure menus (e.g., super grains, brown rice/germinated rice, chicken soups with *ginseng*, high-pressure steamed dishes, grains, high heating power, rice crusts) of the high-pressure mode and the indication such as [high-pressure] to be turned on and white rice, which is the most recently performed high-pressure menu, to be flicked on the display part 114. In addition, the controller 120 causes the non-pressure menus to be turned off.

In FIG. 9B, the controller 120 causes the non-pressure menus (e.g., instant noodles, baby food, non-pressure steamed dishes, and rice porridges) of the non-pressure mode and the indication such as [non-pressure] to be turned on and non-pressure white rice, which is the most recently performed non-pressure menu, to be flicked on the display part 114. In addition, the controller 120 causes the high-pressure menus to be turned off.

Figure 10:
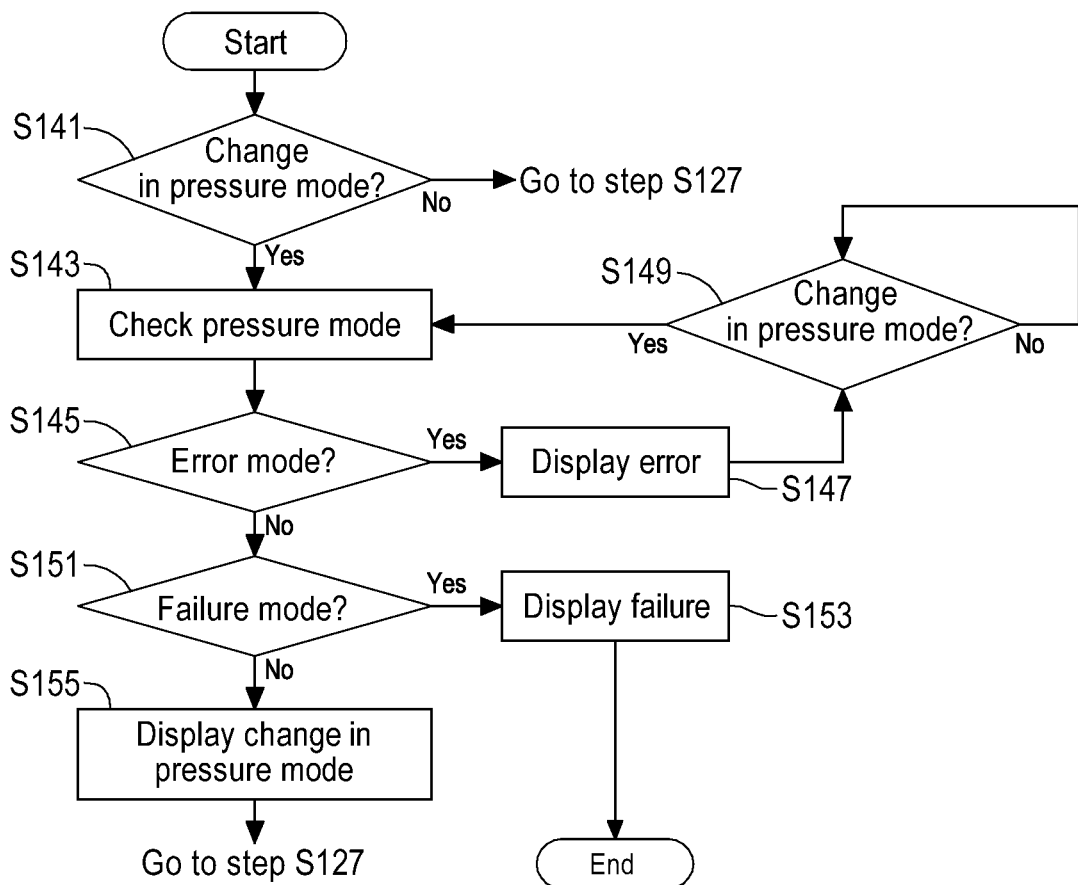
FIG. 10 is a flowchart showing sequential steps of a control process when there is a change in pressure mode during the menu selection process of FIG. 8.

FIG. 10 is a flowchart showing sequential steps of a control process when there is a change in pressure mode during the menu selection process of FIG. 8. The controller 120 performs the control process of FIG. 10 while performing the menu selection process of FIG. 8.

In step S141, the controller 120 determines whether there is a change in current pressure mode. For the purpose of this determination, the controller 120 determines whether there is a change in reception and non-reception states of the first and second sensing signals in the current pressure mode. If there is a change in current pressure mode, the process goes to step S143, and if not, since there is no change in position of the handle part 11 or there is no rotation thereof, the process goes back to step S127 (or step S129).

In step S143, the controller 120 determines the changed pressure mode, and the determined pressure mode (i.e., the changed pressure mode) is recognized as the current pressure mode. The controller 120 performs step S143 and then goes to step S145.

In step S145, the controller 120 is operated in the same manner as step S105. If the current pressure mode is the error mode, the process goes to step S147, and if not, the process goes to step S151.

In step S147, the controller 120 causes the display part 114 to display an error that the position of the handle part 11 is not the high-pressure or non-pressure position but the intermediate position or that the position of the handle part 11 should be changed to the high-pressure or non-pressure position, and then goes to step S149. Here, the controller 120 can ignore or discard the input from the input part 112 until the current pressure mode is changed again to the high-pressure mode or the non-pressure mode in steps S127 and S129.

In step S149, the controller 120 determines whether there is a change in current pressure mode as in step S141. In step S149, the controller 120 allows the user to change the pressure mode to the high-pressure mode or the non-pressure mode, with the display of the error. If there is a change in current pressure mode, the process goes to step S143, and if not, the process goes to step S149.

Also, while performing step S147 and/or step S149, if the controller 120 acquires the menu selection input or the cooking start input from the input part 112, the controller 120 causes the display part 114 to visually and/or audibly display a sound or message to guide the user to change the current pressure mode to the pressure mode corresponding to the selected menu.

In step S151, the controller 120 determines whether the current pressure mode is the failure mode as in step S109. If the current pressure mode is the failure mode, the process goes to step S153, and if not, the process goes to step S155.

In step S153, the controller 120 causes the failure to be displayed as in step S111 and ends the control process not to perform any further operation, for the user's safety.

In step S155, the controller 120 causes the display part 114 to visually or audibly display the change in the high-pressure mode or the non-pressure mode, which is the current pressure mode, to inform the user of the current pressure mode and draw the user's attention, as in step S125. The controller 120 goes back to step S127 (or step S129), after step S155, to perform the menu selection corresponding to the changed current pressure mode.

Step S141 of FIG. 10 is performed until the cooking start input is acquired in each of the first and second menu display and selection methods, and steps S143 to S155 are sequentially performed if there is a change in pressure mode.

Figure 11:
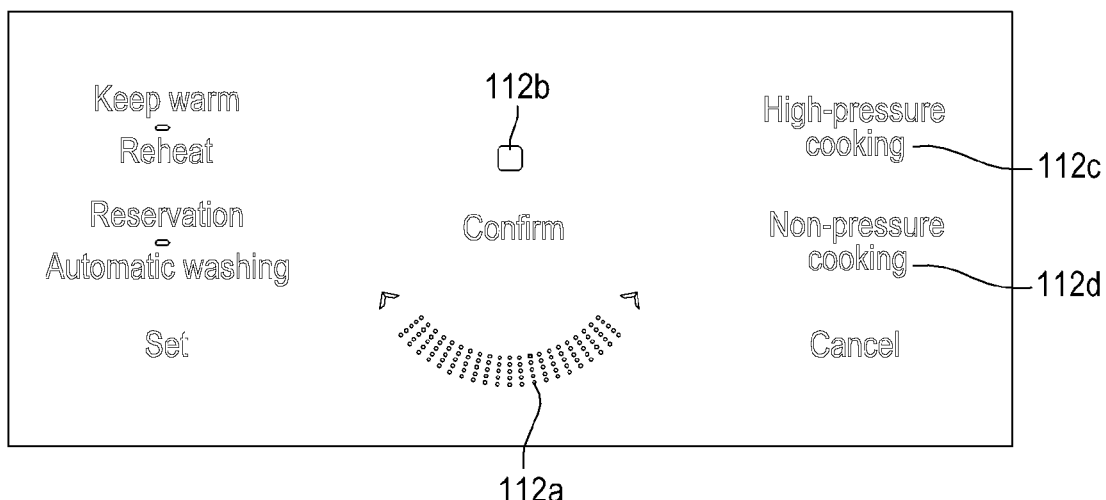
FIG. 11 shows an example of an input part 112.

FIG. 11 shows an example of the input part 112. The input part 112 of FIG. 11 is implemented in a touch panel type, where a first input part 112*a* shows a menu selection input, a second input part 112*b* shows a menu selection confirmation input, a high-pressure cooking input part 112*c* shows a cooking start input in a high-pressure mode (i.e., high-pressure cooking start input), and a non-pressure cooking input part 112*d* shows a cooking start input in a non-pressure mode (i.e., non-pressure cooking start input).

Figure 12A:
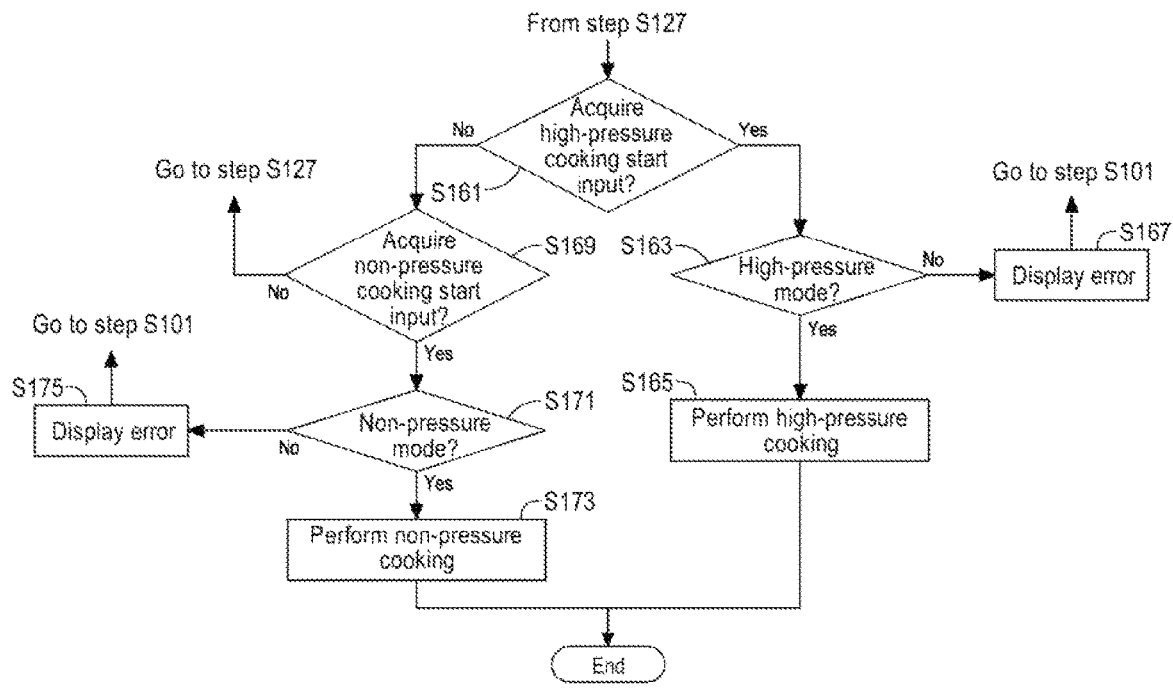
FIGS. 12A and 12B are flowcharts showing another example of the cooking start input process of FIG. 8.
Figure 12B:
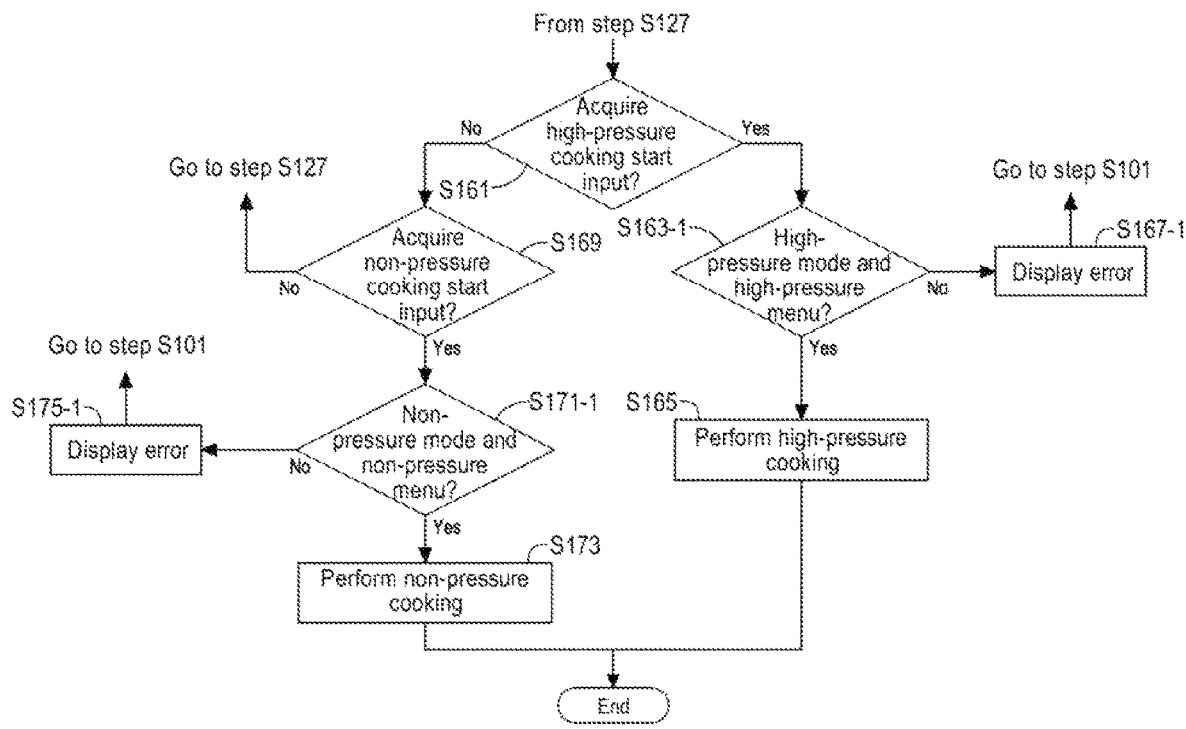

FIGS. 12A and 12B are flowcharts showing other examples of the cooking start input process of FIG. 8. The example of FIG. 12A, which corresponds to a method of controlling the electric cooker with the input part 112 of FIG. 11, is performed after step S127 of FIG. 8 to which the second menu display and selection method is applied.

In step S161, following step S127, the controller 120 determines whether the high-pressure cooking start input has been acquired from the input part 112 (or the high-pressure cooking input part 112*c*). If the high-pressure cooking start input has been acquired, the process goes to step S163, and if not, the process goes to step S169.

In step S163, the controller 120 determines whether the current pressure mode is the high-pressure mode. If the current pressure mode is the high-pressure mode, the process goes to step S165, and if not, since the current pressure mode is the non-pressure mode, the process goes to step S167. Alternatively, since the user can select a menu from the menus corresponding to the current pressure mode in the second menu display and selection method, and since the controller 120 already stores the selected menus corresponding to the current pressure mode prior to step S163, the controller 120 may determine whether the selected menu is the high-pressure menu and check the same result as that of step S163.

In step S165, the controller 120 controls the heating part 19*c* and the steam discharge part 90*b* to perform the high-pressure cooking on the selected menu (high-pressure menu) based on the sensing temperature from the temperature sensing part 116.

In step S167, the controller 120 causes the display part 114 to visually or audibly display an error that not the non-pressure mode start input but the high-pressure mode start input has been acquired, to draw the user's attention, and goes back to step S101. Alternatively, the controller 120 goes from step S167 to step S127 to allow the user to select a new menu or goes to step S161 to allow the user to input a cooking start input corresponding to the current pressure mode through the input part 112.

In step S169, the controller 120 determines whether the non-pressure cooking start input has been acquired from the input part 112 (or the non-pressure cooking input part 112*d*). If the non-pressure cooking start input has been acquired, the controller 120 goes to step S171, and if not, the controller 120 goes to step S127 to allow the user to select a new menu or goes to step S161 to wait for the high-pressure cooking start input or the non-pressure cooking start input from the input part 112.

In step S171, the controller 120 determines whether the current pressure mode is the non-pressure mode. If the current pressure mode is the non-pressure mode, the process goes to step S173, and if not, since the current pressure mode is the high-pressure mode, the process goes to step S175. Alternatively, since the user can select a menu from the menus corresponding to the current pressure mode in the second menu display and selection method, and since the controller 120 already stores the selected menus corresponding to the current pressure mode prior to step S169, the controller 120 may determine whether the selected menu is the non-pressure menu and check the same result as that of step S171.

In step S173, the controller 120 controls the heating part 19c to perform the non-pressure cooking on the selected menu (non-pressure menu) based on the sensing temperature from the temperature sensing part 116.

In step S175, the controller 120 causes the display part 114 to visually or audibly display an error that not the high-pressure mode start input but the non-pressure mode start input has been acquired, to draw the user's attention, and goes back to step S101. Alternatively, the controller 120 goes from step S175 to step S127 to allow the user to select a new menu or goes to step S161 to allow the user to input a cooking start input corresponding to the current pressure mode through the input part 112.

By means of the example of FIG. 12A, the controller 120 causes the current pressure mode and the cooking start input (high-pressure cooking start input or non-pressure cooking start input) to correspond to each other prior to the cooking process of steps S165 and S173, thereby continuously informing the user of the pressure mode for cooking.

The example of FIG. 12B, which corresponds to a method of controlling the electric cooker with the input part 112 of FIG. 11, is performed after step S127 of FIG. 8 to which the first menu display and selection method is applied.

Step S161 of FIG. 12B is the same as step S161 of FIG. 12A.

In step S163-1, the controller 120 determines whether the current pressure mode is the high-pressure mode and the selected menu is the high-pressure menu. If the current pressure mode is the high-pressure mode and the selected menu is the high-pressure menu, the process goes to step S165, and if not, the process goes to step S167-1.

Since all of the high-pressure cooking start input and the high-pressure mode and the selected menu correspond to the high-pressure, step S165 is the same as step S165 of FIG. 12A.

In step S167-1, since one or more of the high-pressure cooking start input and the current pressure mode and the selected menu do not correspond to the high-pressure, the controller 120 causes the display part 114 to visually or audibly display an error that the pressure mode (non-pressure mode) and/or the selected menu (non-pressure menu) do not correspond to the high-pressure cooking start input, to draw the user's attention, and goes back to step S101. Alternatively, the controller 120 goes from step S167-1 to step S127 to allow the user to select a new menu or goes to step S161 to allow the user to input a cooking start input corresponding to the current pressure mode and menu through the input part 112.

Step S169 is the same as step S169 of FIG. 12A.

In step S171-1, the controller 120 determines whether the current pressure mode is the non-pressure mode and the selected menu is the non-pressure menu. If the current pressure mode is the non-pressure mode and the selected menu is the non-pressure menu, the process goes to step S173, and if not, the process goes to step S175-1.

Since all of the non-pressure cooking start input and the non-pressure mode and the selected menu correspond to the non-pressure, step S173 is the same as step S173 of FIG. 12A.

In step S175-1, since one or more of the non-pressure cooking start input and the current pressure mode and the selected menu do not correspond to the non-pressure, the controller 120 causes the display part 114 to visually or audibly display an error that the pressure mode (high-pressure mode) and/or the selected menu (high-pressure menu) do not correspond to the non-pressure cooking start input, to draw the user's attention, and goes back to step S101. Alternatively, the controller 120 goes from step S175-1 to step S127 to allow the user to select a new menu or goes to step S161 to allow the user to input a cooking start input corresponding to the current pressure mode and menu through the input part 112.

Figure 13:
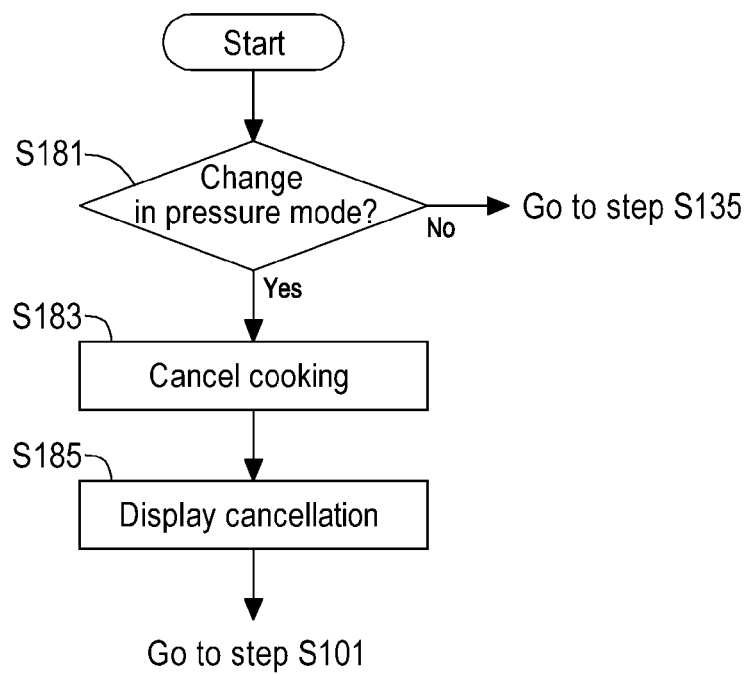
FIG. 13 is a flowchart showing sequential steps of a control process when there is a change in pressure mode during the cooking process of FIG. 8.

FIG. 13 is a flowchart showing sequential steps of a control process when there is a change in pressure mode during the cooking process of FIG. 8. Since the pressure mode of the pressure conversion part may be changed by the user, the controller 120 performs the control process of FIG. 13 while performing step S135 of FIG. 8 and steps S165 and S173 of FIGS. 12A and 12B.

In step S181, the controller 120 determines whether there is a change in current pressure mode while performing step S135 (or step S165 or step S173). For the purpose of this determination, the controller 120 determines whether there is a change in reception and non-reception states of the first and second sensing signals in the current pressure mode. If there is a change in current pressure mode, the process goes to step S183, and if not, since there is no change in position of the handle part 11 or there is no rotation thereof, the process goes to step S135 (or step S165 or step S173).

In step S183, since the current pressure mode has been changed and the changed current pressure mode does not correspond to the selected menu, the controller 120 cancels the cooking being currently performed and interrupts the heating operation of the heating part 19c. The controller 120 performs step S183 and goes to step S185.

In step S185, the controller 120 informs the user that there has been a change in current pressure mode during the cooking process and causes the display part 114 to visually or audibly display the cancellation of the cooking being currently performed. The controller 120 goes back to step S101 so that the user can change the pressure mode or menu to correspond to the current pressure mode and menu after step S185.

In steps S183 and S185, while the cooking is being performed according to the non-pressure mode algorithm or the high-pressure mode algorithm, if the pressure mode is changed, in particular, from the high-pressure mode to the non-pressure mode, there is a risk of suddenly discharging the steam inside the inner pot to the outside and causing a burn to the user, and thus the controller 120 should preferably cancel the cooking. In addition, due to the change in pressure mode, the selected menu does not correspond to the changed current pressure mode, and the quality of food to be cooked may be reduced because the food cooked according to the algorithm corresponding to the previous pressure mode until the time of changing is to be cooked according to the algorithm corresponding to a different pressure mode, as a result of which the controller 120 should preferably cancel the cooking.

It will be apparent to those skilled in the art that various modifications can be made to the above-described exemplary embodiments of the present disclosure without departing from the spirit or scope of the disclosure. Thus, it is intended that the present disclosure covers all such modifications provided they come within the scope of the appended claims and their equivalents.

What is claimed is:

1. An electric cooker, comprising:
   a main body having an accommodation space therein to receive an inner pot;
   a lid coupled to an upper portion of the main body to be opened and closed;
   a pressure conversion part for selecting a high-pressure mode and a non-pressure mode by opening and closing a plurality of discharge paths configured to pass through and to block a gap between an inside of the inner pot and an outside of the lid;
   a first sensor configured for sensing the high-pressure mode or the non-pressure mode selected by the pressure conversion part and generating a first sensing signal corresponding thereto;
   a second sensor configured for sensing a different pressure mode from the pressure mode sensed by the first sensor and generating a second sensing signal corresponding thereto;
   a controller comprising a computer controller in electronic communication with the first sensor and the second sensor for receiving the first sensing signal and the second sensing signal and determining the pressure mode based on the first sensing signal from the first sensor among the pressure modes including at least the high-pressure mode and the non-pressure mode; and
   a display part in electrical communication with the controller and controlled thereby, the display part configured for displaying prestored menus including high-pressure menus and non-pressure menus and the pressure modes at least including the high-pressure mode and the non-pressure mode,
   wherein the controller determines the current pressure mode based on the first sensing signal from the first sensor and the second sensing signal from the second sensor and causes the display part to visually or audibly display the current pressure mode.

2. The electric cooker of claim 1, wherein the controller determines whether there is a change in the current pressure mode and causes the menus and the pressure modes to be displayed differently when there is a change in the current pressure mode and when there is no change in the current pressure mode.

3. The electric cooker of claim 2, wherein if there is no change in the current pressure mode, the controller causes the current pressure mode and a most recently performed menu corresponding to the current pressure mode to be turned on to be displayed on the display part, and if there is a change in the current pressure mode, the controller causes the display of a menu corresponding to the changed pressure mode to be flickered for a certain time, the menus other than the flickered menu to be turned on to visually or audibly display the change in the pressure mode, and the changed pressure mode and the most recently performed menu corresponding to the changed pressure mode to be turned on.

4. The electric cooker of claim 1, comprising an input part for receiving a selection-confirmed menu input from a user among the menus displayed on the display part, wherein the controller causes the display part to display the prestored menus and receives the selection-confirmed menu input from the input part.

5. The electric cooker of claim 4, wherein the controller determines whether there is a change in the current pressure mode until the controller acquires a cooking start input from the input part.

6. The electric cooker of claim 5, wherein if there is a change in the current pressure mode, the controller causes the menu corresponding to the changed pressure mode to be flickered for a certain time, the menus other than the flickered menu to be turned on to visually or audibly display the change in the pressure mode, and the changed pressure mode and the most recently performed menu corresponding to the changed pressure mode to be turned on and receives the selection-confirmed menu input from the input part.

7. The electric cooker of claim 4, wherein the controller acquires a cooking start input from the input part and determines whether the current pressure mode corresponds to the selection-confirmed menu.

8. The electric cooker of claim 7, wherein if the current pressure mode corresponds to the selection-confirmed menu, the controller performs the cooking according to a cooking algorithm in the current pressure mode, and if the current pressure mode does not correspond to the selection-confirmed menu, the controller causes the display part to display an error that the current pressure mode does not correspond to the selection-confirmed menu and receives the selection-confirmed menu input again from the input part.

9. The electric cooker of claim 8, wherein the controller determines whether there is a change in the current pressure mode while performing the cooking algorithm.

10. The electric cooker of claim 9, wherein if there is a change in the current pressure mode, the controller cancels the cooking algorithm, and if there is no change in the current pressure mode, the controller performs the cooking algorithm.

11. The electric cooker of claim 4, wherein the controller acquires either a high-pressure cooking start input or a non-pressure cooking start input from the input part and determines whether the cooking start input and the current pressure mode and the selected menu correspond to each other.

12. The electric cooker of claim 11, wherein if the cooking start input and the current pressure mode and the selected menu correspond to each other, the controller performs a cooking algorithm corresponding to the current pressure mode, and if any one of the cooking start input and the current pressure mode and the selected menu do not correspond to each other, the controller causes the display part to display an error of the cooking start input.

13. The electric cooker of claim 12, wherein the controller determines whether there is a change in the current pressure mode while performing the cooking algorithm.

14. The electric cooker of claim 13, wherein if there is a change in the current pressure mode, the controller cancels the cooking algorithm, and if there is no change in the current pressure mode, the controller performs the cooking algorithm.

15. The electric cooker of claim 4, wherein the controller acquires either a high-pressure cooking start input or a non-pressure cooking start input from the input part and determines whether a cooking start input corresponds to the current pressure mode.

16. The electric cooker of claim 15, wherein if the cooking start input corresponds to the current pressure mode, the controller performs a cooking algorithm corresponding to the current pressure mode, and if the cooking start input does not correspond to the current pressure mode, the controller causes the display part to display an error of the cooking start input.

17. The electric cooker of claim 16, wherein the controller determines whether there is a change in the current pressure mode while performing the cooking algorithm.

18. The electric cooker of claim 17, wherein if there is a change in the current pressure mode, the controller cancels the cooking algorithm, and if there is no change in the current pressure mode, the controller performs the cooking algorithm.

19. The electric cooker of claim 1, comprising an input part for receiving a selection-confirmed menu input from a user among the menus displayed on the display part, wherein the controller causes only the menus corresponding to the current pressure mode or the prestored menus to be turned on and receives the selection-confirmed menu input from the input part among the menus corresponding to the current pressure mode.

20. The electric cooker of claim 19, wherein the controller determines whether there is a change in the current pressure mode until the controller acquires a cooking start input from the input part, and if there is a change in the current pressure mode, the controller causes the menu corresponding to a changed pressure mode to be flickered for a certain time, the menus other than the flickered menu to be turned on to visually or audibly display the change in pressure mode, and the changed pressure mode and a most recently performed menu corresponding to the changed pressure mode to be turned on and receives the selection-confirmed menu input from the input part.

21. The electric cooker of claim 19, wherein the controller acquires a cooking start input from the input part and performs cooking according to a cooking algorithm in the current pressure mode.

22. The electric cooker of claim 21, wherein the controller determines whether there is a change in the current pressure mode while performing the cooking algorithm.

23. The electric cooker of claim 22, wherein if there is a change in the current pressure mode, the controller cancels the cooking algorithm, and if there is no change in the current pressure mode, the controller performs the cooking algorithm.

24. The electric cooker of claim 1, wherein the current pressure mode comprises an error mode in which the first and second sensing signals cannot be received.

25. The electric cooker of claim 24, wherein if the current pressure mode is the error mode, the controller causes the display part to display that the pressure conversion part should be operated in the high-pressure mode or the non-pressure mode.

26. The electric cooker of claim 24, comprising an input part for acquiring an input, wherein if the current pressure mode is the error mode, the controller ignores or discards the input from the input part.

27. The electric cooker of claim 26, wherein when determining that the current pressure mode is the high-pressure mode or the non-pressure mode, the controller ends the process of ignoring or discarding the input.

28. The electric cooker of claim 1, wherein the current pressure mode comprises a failure mode in which both the first and second sensing signals are received.

29. The electric cooker of claim 28, comprising an input part for acquiring an input, wherein if the current pressure mode the failure mode, the controller causes the display part to display the failure of the electric cooker and ignores or discards the input from the input part.

* * * * *